United States Patent
Melaas et al.

(10) Patent No.: US 12,277,761 B2
(45) Date of Patent: *Apr. 15, 2025

(54) REMOTE SENSING ALGORITHMS FOR MAPPING REGENERATIVE AGRICULTURE

(71) Applicant: Indigo Ag, Inc., Charlestown, MA (US)

(72) Inventors: Eli Kellen Melaas, Needham, MA (US); Bobby Harold Braswell, Portsmouth, NH (US); Douglas Kane Bolton, Boston, MA (US)

(73) Assignee: Indigo Ag, Inc., Charlestown, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/435,087

(22) Filed: Feb. 7, 2024

(65) Prior Publication Data
US 2024/0257515 A1 Aug. 1, 2024

Related U.S. Application Data

(63) Continuation of application No. 18/156,814, filed on Jan. 19, 2023, now Pat. No. 11,978,251, which is a continuation of application No. PCT/US2021/042542, filed on Jul. 21, 2021.

(60) Provisional application No. 63/178,278, filed on Apr. 22, 2021, provisional application No. 63/054,688, filed on Jul. 21, 2020.

(51) Int. Cl.
*G06V 20/10* (2022.01)
*G06V 20/13* (2022.01)

(52) U.S. Cl.
CPC ............ *G06V 20/188* (2022.01); *G06V 20/13* (2022.01)

(58) Field of Classification Search
CPC .. A01B 79/005; G06V 10/765; G06V 20/188; G06V 20/13
See application file for complete search history.

(56) References Cited

U.S. PATENT DOCUMENTS

| | | |
|---|---|---|
| 6,422,508 B1 | 7/2002 | Barnes |
| 6,611,726 B1 | 8/2003 | Crosswhite |
| 7,212,670 B1 | 5/2007 | Rousselle et al. |

(Continued)

FOREIGN PATENT DOCUMENTS

| | | |
|---|---|---|
| AU | 2012101249 A4 | 9/2012 |
| CN | 109360117 A | 2/2019 |

(Continued)

OTHER PUBLICATIONS

Bermudez, C. (2016). Development of a remote sensing protocol for inventorying cover crop adoptions (Order No. 10167690). Available from ProQuest Dissertations & Theses Global. (1845052928). (Year: 2016).*

(Continued)

*Primary Examiner* — Vu Le
*Assistant Examiner* — Tracy Mangialaschi
(74) *Attorney, Agent, or Firm* — Fenwick & West LLP

(57) ABSTRACT

This invention relates to methods for determining adoption and impact of regenerative farming practices. Embodiments of these methods, take satellite imagery and weather data as inputs, process those data according to methods of the present invention, and produce outputs which indicate whether a specific farming practice (for example, no-till or cover cropping) was adopted for a particular field or region for a particular season.

20 Claims, 29 Drawing Sheets

(56) References Cited

U.S. PATENT DOCUMENTS

| | | |
|---|---|---|
| 7,675,549 B1 | 3/2010 | Brower et al. |
| 8,965,812 B2 | 2/2015 | Linville |
| 9,113,590 B2 | 8/2015 | Johnson |
| 9,381,646 B1 | 7/2016 | Fryshman |
| 9,489,576 B2 | 11/2016 | Johnson et al. |
| 9,519,861 B1 | 12/2016 | Gates et al. |
| 9,563,945 B2 | 2/2017 | Fryshman |
| 9,582,002 B2 | 2/2017 | Cavender-Bares |
| 9,582,873 B2 | 2/2017 | Ulman |
| 9,629,306 B2 | 4/2017 | Sauder et al. |
| 9,658,201 B2 | 5/2017 | Redden et al. |
| 9,745,060 B2 | 8/2017 | O'Connor et al. |
| 9,756,844 B2 | 9/2017 | Groeneveld |
| 9,880,140 B2 | 1/2018 | Osborne et al. |
| 9,928,578 B1 | 3/2018 | Chartrand et al. |
| RE46,968 E | 7/2018 | Linville |
| 10,445,877 B2 | 10/2019 | Albrecht et al. |
| RE47,742 E | 11/2019 | Linville |
| 10,564,316 B2 | 2/2020 | Xu et al. |
| 10,902,655 B1 | 1/2021 | Snyder |
| 11,100,579 B1 | 8/2021 | Raguse et al. |
| 11,762,125 B2 | 9/2023 | Xu et al. |
| 2003/0019408 A1 | 1/2003 | Fraisse et al. |
| 2005/0234691 A1 | 10/2005 | Singh et al. |
| 2007/0014488 A1 | 1/2007 | Chen et al. |
| 2007/0229524 A1 | 10/2007 | Hendrey et al. |
| 2008/0174593 A1 | 7/2008 | Ham et al. |
| 2009/0037441 A1 | 2/2009 | Howell et al. |
| 2009/0259709 A1 | 10/2009 | Nilkitin |
| 2010/0082564 A1 | 4/2010 | Fernekes |
| 2010/0321399 A1 | 12/2010 | Ellren et al. |
| 2010/0332430 A1 | 12/2010 | Caraviello et al. |
| 2012/0143504 A1 | 6/2012 | Kalai et al. |
| 2012/0191773 A1 | 7/2012 | Appleton |
| 2013/0332205 A1 | 12/2013 | Friedberg et al. |
| 2014/0039967 A1 | 2/2014 | Scharf et al. |
| 2014/0095261 A1 | 4/2014 | Johnson |
| 2014/0222374 A1 | 8/2014 | Lock et al. |
| 2014/0263822 A1 | 9/2014 | Malveaux |
| 2015/0278640 A1 | 10/2015 | Johnson et al. |
| 2016/0050840 A1 | 2/2016 | Sauder et al. |
| 2016/0071410 A1 | 3/2016 | Rupp et al. |
| 2016/0073573 A1 | 3/2016 | Ethington et al. |
| 2016/0157414 A1 | 6/2016 | Ackerman et al. |
| 2016/0171680 A1 | 6/2016 | Lobell |
| 2016/0180473 A1 | 6/2016 | Groeneveld |
| 2016/0216245 A1 | 7/2016 | Sutton |
| 2016/0232621 A1 | 8/2016 | Ethington et al. |
| 2016/0302351 A1 | 10/2016 | Schildroth et al. |
| 2016/0309646 A1 | 10/2016 | Starr et al. |
| 2017/0041407 A1 | 2/2017 | Wilbur et al. |
| 2017/0083747 A1 | 3/2017 | Guan et al. |
| 2017/0089761 A1 | 3/2017 | McQuilkin et al. |
| 2017/0090068 A1 | 3/2017 | Xiang et al. |
| 2017/0105335 A1 | 4/2017 | Xu et al. |
| 2017/0109395 A1 | 4/2017 | Farah |
| 2017/0112043 A1 | 4/2017 | Nair et al. |
| 2017/0124463 A1 | 5/2017 | Chen et al. |
| 2017/0161627 A1 | 6/2017 | Xu et al. |
| 2017/0168157 A1 | 6/2017 | Hagerman et al. |
| 2017/0169523 A1 | 6/2017 | Xu et al. |
| 2017/0177938 A1 | 6/2017 | Papanikolopoulos et al. |
| 2017/0196171 A1 | 7/2017 | Xu et al. |
| 2017/0199528 A1 | 7/2017 | Detweiler et al. |
| 2017/0206415 A1 | 7/2017 | Redden |
| 2017/0213141 A1 | 7/2017 | Xu et al. |
| 2017/0228475 A1 | 8/2017 | Aldor-Noiman et al. |
| 2017/0231213 A1 | 8/2017 | Gordon et al. |
| 2017/0257426 A1 | 9/2017 | Wilbur et al. |
| 2017/0258005 A1 | 9/2017 | Cutter |
| 2017/0270446 A1 | 9/2017 | Starr et al. |
| 2017/0287436 A1 | 10/2017 | Korzunov |
| 2017/0287437 A1 | 10/2017 | Korzunov |
| 2018/0049043 A1 | 2/2018 | Hoffberg |
| 2018/0070527 A1 | 3/2018 | Richt |
| 2018/0075545 A1 | 3/2018 | Richt |
| 2018/0137675 A1 | 5/2018 | Kwant et al. |
| 2018/0211156 A1 | 7/2018 | Guan et al. |
| 2019/0019008 A1 | 1/2019 | Guan et al. |
| 2019/0050948 A1 | 2/2019 | Perry et al. |
| 2020/0008371 A1 | 1/2020 | Hassanzadeh et al. |
| 2020/0077574 A1 | 3/2020 | Bull et al. |
| 2022/0067614 A1 | 3/2022 | Guan et al. |
| 2022/0138767 A1 | 5/2022 | Ashtekar et al. |
| 2022/0180526 A1 | 6/2022 | Braswell et al. |
| 2022/0210987 A1 | 7/2022 | Baldo |
| 2022/0215659 A1 | 7/2022 | Melaas et al. |
| 2022/0237888 A1 | 7/2022 | Mohite et al. |
| 2022/0261928 A1 | 8/2022 | Malizia et al. |
| 2022/0342536 A1 | 10/2022 | Bontjes |
| 2022/0343229 A1 | 10/2022 | Gruber et al. |
| 2023/0092057 A1 | 3/2023 | Holden et al. |

FOREIGN PATENT DOCUMENTS

| | | |
|---|---|---|
| CN | 109685081 A | 4/2019 |
| CN | 106529451 B | 6/2019 |
| CN | 110287869 A | 9/2019 |
| CN | 110909679 A | 3/2020 |
| CN | 108764688 B | 11/2021 |
| KR | 10-1703442 B1 | 2/2017 |
| WO | WO 2020/055950 A1 | 3/2020 |
| WO | WO 2020/123342 A1 | 6/2020 |
| WO | WO-2021/007352 A1 | 1/2021 |
| WO | WO 2021/041666 A1 | 3/2021 |
| WO | WO 2021/062147 A1 | 4/2021 |
| WO | WO 2021/062177 A1 | 4/2021 |
| WO | WO-2021/007352 A8 | 8/2021 |
| WO | WO 2021/222763 A1 | 11/2021 |
| WO | WO 2022/020448 A1 | 1/2022 |

OTHER PUBLICATIONS

Wu X. Variation and Causal Factors of Planting Area and Phenological Events of Winter Wheat in the North China Plain. (Doctoral dissertation, Chiba University). Feb. 2020. (Year: 2020).*

Htitiou, Abdelaziz, et al. "The performance of random forest classification based on phenological metrics derived from Sentinel-2 and Landsat 8 to map crop cover in an irrigated semi-arid region." Remote Sensing in Earth Systems Sciences 2.4 (2019): 208-224. (Year: 2019).*

Github, "cogeo-mosaic," Jun. 13, 2019, pp. 1-11, [Online] Retrieved from the Internet <URL: https://github.com/developmentseed/mosaicjson-spec>.

Github, "Marblecutter," Jul. 31, 2017 pp. 1-4, [Online] Retrieved from the Internet <URL:https://github.com/mojodna/marblecutter>.

Github, "rio-tiler," Oct. 14, 2020, pp. 1-14, [Online] Retrieved from the Internet <URL:https://github.com/cogeotiff/rio-tiler>.

Github, "Terracotta," Mar. 6, 2018, pp. 1-5, [Online] Retrieved from the Internet <URL:https://github.com/DHI/terracotta>.

PCT International Search Report and Written Opinion, PCT Application No. PCT/US2023/085208, Apr. 29, 2024, eight pages.

Ritchie, G.L. et al., "Sensitivities of Normalized Difference Vegetation Index and a Green/Red Ratio Index to Cotton Ground Cover Fraction," Crop science, vol. 50, May 2010, pp. 1000-1010.

United States Office Action, U.S. Appl. No. 17/681,126, filed Apr. 25, 2024, 16 pages.

United States Office Action, U.S. Appl. No. 18/051,789, filed Apr. 18, 2024, six pages.

Bermudez, C., "Development of a remote sensing protocol for inventorying cover crop adoptions," Iowa State University Master of Science Thesis, 2016, pp. 1-80.

Gao, F. et al., "A within-season approach for detecting early growth stages in corn and soybean using high temporal and spatial resolution imagery," Remote Sens Environ, vol. 242: 111752, Mar. 2020, pp. 1-19.

PCT International Search Report and Written Opinion, PCT Application No. PCT/US2021/042542, Oct. 24, 2021, nine pages.

Wardlow et al., "Discriminating cropping patterns in the US Central Great Plains region using time-series Modis 250-meter Novi data-

(56) References Cited

OTHER PUBLICATIONS

Preliminary Results," In Proceedings, Pecora 15 and Land Satellite Information IV Conference, 2002, pp. 1-12.
Aji, A. et al., "Hadoop-GIS: A High Performance Spatial Data Warehousing System over MapReduce," Proceedings VLDB Endowment 6(11), Aug. 2013, pp. 1009-1020.
Becker-Reshef, I. et al., "Prior Season Crop Type Masks for Winter Wheat Yield Forecasting: A US Case Study," Remote Sensing, 10: 1659, Oct. 19, 2018, pp. 1-20.
Bratten, J., "Landsatlinkr 0.1.4 User Guide," Guide version 0.1.4a draft, Mar. 5, 2015, pp. 1-42.
European Patent Office, Extended European Search Report, EP Patent Application No. 21796375.0, Dec. 19, 2023, nine pages.
European Patent Office, Extended European Search Report, EP Patent Application No. 20836088.3, Jun. 14, 2023, ten pages.
Kuzyakova, I.F. et al., "Time series analysis and mixed models for studying the dynamics of net N mineralization in a soil catena at Gondelsheim (S-W Germany)," Geoderma, vol. 136, Sep. 7, 2006, pp. 803-818.
Lin, X. et al., "Carbon Emissions Estimation and Spatiotemporal Analysis of China at City Level Based on Multi-Dimensional Data and Machine Learning," Remote Sensing 14(13), 3014, Jun. 23, 2022, pp. 1-18.
Luo, D. et al., "Integrated Carbon Footprint and Economic Performance of Five Types of Dominant Cropping Systems in China's Semiarid Zone," Sustainability 14(10), 5844, May 11, 2022, pp. 1-17.
PCT International Search Report and Written Opinion, PCT Application No. PCT/US2023/078118, Feb. 22, 2024, 11 pages.
PCT International Search Report and Written Opinion, PCT International Application No. PCT/US2020/041256, Oct. 5, 2020, 13 pages.
PCT International Search Report and Written Opinion, PCT International Application No. PCT/US2020/048188, Nov. 13, 2020, nine pages.
PCT International Search Report and Written Opinion, PCT International Application No. PCT/US2020/052706, Dec. 7, 2020, eight pages.
PCT International Search Report and Written Opinion, PCT International Application No. PCT/US2020/052755, Feb. 11, 2021, eight pages.
PCT International Search Report and Written Opinion, PCT International Application No. PCT/US2021/030196, Aug. 4, 2021, 12 pages.
Vorobiova, N.S. et al., "NDVI time series modeling in the problem of crop identification by satellite images," Information Technology and Nanotechnology, 2016, pp. 428-436.
Wang, H. "A Large-scale Dynamic Vector and Raster Data Visualization Geographic Information System Based on Parallel Map Tiling," FIU Electronic Theses and Dissertations, Nov. 8, 2011, pp. 1-77.
Xie, Y. et al., "Mapping irrigated cropland extent across the conterminous United States at 30 m resolution using a semi-automatic training approach on Google Earth Engine," ISPRS Journal of Photogrammetry and Remote Sensing, vol. 155, Sep. 2019, pp. 136-149.
Zhang, G. et al., "Mapping paddy rice planting areas through time series analysis of Modis land surface temperature and vegetation index data," ISPRS Journal of Photogrammetry and Remote Sensing, vol. 106, Aug. 2015, pp. 157-171.
Bolton, D.K. et al., "Continental-scale land surface phenology from harmonized Landsat 8 and Sentinel-2 imagery," Remote Sensing of Environment, vol. 240, Feb. 8, 2020, pp. 1-16.
European Patent Office, Extended European Search Report, EP Patent Application No. 21846539.1, Jan. 27, 2025, eight pages.
Gray, J. et al., "User Guide to Collection 6 MODIS Land Cover Dynamics (MCD12Q2) Product," NASA, Jan. 19, 2019, pp. 1-8.
Li, L. et al., "Combining Crop Proportion Phenology Index models with machine learning algorithms for estimating winter wheat areas," 2016 IEEE International Geoscience and Remote Sensing Symposium (IGARSS), Beijing, China, 2016, pp. 7137-7140.
Song, R. et al., "Evaluation of Lansat 8 Time Series Image Stacks for Predicting Yield and Yield Components of Winter Wheat," Igarss 2016, pp. 6300-6303.
Sumalatha, M.R. et al., "Real Time Big Data Analytics for Agricultural Land Hotspot Prediction," 2019 International Conference on Computational Intelligence and Knowledge Economy, Dec. 2019, pp. 411-416.
Wang, D. et al., "Improving LAI Mapping by Integrating MODIS and Cyclopes Lai Products Using Optimal Interpolation," IEEE Journal of Selected Topics in Applied Earth Obserations and Remote Sensing, vol. 7, No. 2, Feb. 2014, pp. 445-457.
Zhaoxia, D. et al., "Evaluation on Extrapolation Efficiency of Multiple Estimators for Winter Wheat Planting Acreage Estimation," 2014 The Third International Conference on Agro-Geoinformatics, Beijing, China, 2014, pp. 1-6.

* cited by examiner

REMOTE SENSING ALGORITHMS FOR MAPPING REGENERATIVE AGRICULTURE

CROSS-REFERENCE TO RELATED APPLICATIONS

This application is a continuation of U.S. application Ser. No. 18/156,814, filed Jan. 19, 2023, now U.S. Pat. No. 11,978,251, which application is a continuation of International Application No. PCT/US2021/042542, filed Jul. 21, 2021, which claims the benefit of U.S. Provisional Application No. 63/054,688, filed Jul. 21, 2020, and of U.S. Provisional Application No. 63/178,278, filed Apr. 22, 2021, each of which is hereby incorporated by reference in its entirety.

BACKGROUND

Regenerative agricultural practices such as cover crops and conservation tillage are well connected to long-term benefits in soil health, increased carbon sequestration, and improved resilience to extreme weather events. Understanding how and where these practices are undertaken is essential for helping to drive adoption, better documenting benefits, and improving our understanding of what best practice looks like across a large area.

Tracking regenerative practices, however, is immature, especially when contrasted with the reporting of conventional agricultural reporting driven by crop insurance. Today's accounting of regenerative farming is restricted to an infrequent (every 5th year) USDA census, survey work provided at coarse spatial scales and ad hoc analyses done over a limited geographical area. Therefore, there is a clear need to develop methodologies that enable estimates of regenerative practice adoption rates that are automated, scalable, timely, frequent and detailed.

Methods described in this disclosure ultimately provide information at the field, county, state, region and national scales and provides insights into how farmer practices compare across geographies and time.

SUMMARY OF INVENTION

In one aspect, the invention provides a method of predicting a tillage practice, the method comprising: 1) receiving a time series of satellite imagery, the time series of satellite imagery covering at least a geographic region, during a predetermined time period; 2) generating a first set of field level zonal summary time series from the time series of satellite imagery for at least one field within the geographic region, wherein the field level zonal summary time series comprises at least a normalized difference tillage index (NDTI) time series and a normalized difference vegetation index (NDVI) time series; 3) for each field in the geographic region, determining a dormant period during the predetermined time period, wherein the dormant period is comprised of at least two consecutive observations of NDVI values <0.3; 4) for each observation in each dormant period in the first set of field level zonal summary time series identifying a soil moisture percentage and removing from further analysis dormant periods wherein the average soil moisture percentage during the dormant period exceeds a threshold value; 5) for each dormant period, determining the difference between minimum NDTI value of all observations during the dormant period and the 90th percentile of NDTI values from historical data; and 6) for each field in the geographic region, apply a decision tree classifier to a field wherein a field is predicted to be tilled if minimum NDTI is <0.05 or the difference between minimum NDTI or the 90th percentile of NDTI is >0.09. In some aspects, the time series of satellite imagery comprises satellite imagery from one or more of Landsat, Sentinel-2, and MODIS. In some aspects, the geographic region is one or more states, counties, farms, or fields. In some aspects, cloud or snow pixels are removed from the time series of satellite imagery. In some aspects, observations of the field level zonal summary time series having less than 85% of available pixels are removed from the analysis. In some aspects, the field level zonal summary time series additionally comprises a normalized difference snow index (NDSI) time series and observations where NDSI>0 are removed from analysis. In some aspects, observations of the field level zonal summary time series are removed from analysis if the NDTI value of the subsequent observation increases by >0.05 between observations and <5 mm of rain was recorded between observations. In some aspects, the predetermined time period begins with the end of a first crop season and ends with the end of the following crop season. In some aspects, the end of a crop season is a date a crop is harvested. In some aspects, the beginning of a crop season is a date a crop is planted. In some aspects, the crop season is determined by a crop type and hemisphere in which the geographic region is located. In some aspects, more than one dormant region is detected for a field in the geographic region and the dormant period having the lowest NDTI value is used. In some aspects, the threshold value is 40% soil moisture. In some aspects, the NDTI values from historical data are NDTI values for the field for one or more years prior to the predetermined time period. In some aspects, the NDTI values from historical data are NDTI values for the field for at least 3, at least 5, or at least 10 years prior to the predetermined time period. In some aspects, the NDTI values from historical data are NDTI values for the field for all years prior to the predetermined time period for which NDTI values are available.

In another aspect, the invention provides a method of predicting a date of a tillage event, the method comprising: 1) receiving a time series of satellite imagery, the time series of satellite imagery covering at least a geographic region, during a predetermined time period; 2) generating a first set of field level zonal summary time series from the time series of satellite imagery for at least one field within the geographic region, wherein the field level zonal summary time series comprises at least a normalized difference tillage index (NDTI) time series; 3) for each field in the geographic region, determining a dormant period during the predetermined time period, wherein the dormant period is comprised of at least two consecutive observations of NDVI values <0.3; 4) for each observation in each dormant period in the first set of field level zonal summary time series identifying a soil moisture percentage and removing from further analysis dormant periods wherein the average soil moisture percentage during the dormant period exceeds a threshold value; and 5) for each dormant period, determining the minimum NDTI value of all observations during the dormant period. In some embodiments, the predicted date of a tillage event is the minimum NDTI value of all observations during the dormant period.

In another aspect, the invention provides a method of predicting a cover crop practice, the method comprising: 1) receiving a time series of satellite imagery, the time series of satellite imagery covering at least a geographic region, during a predetermined time period, wherein the predetermined time period begins with the end of a first crop season and ends with the end of the following crop season; 2)

generating a first set of field level zonal summary time series from the time series of satellite imagery for at least one field within the geographic region, wherein the field level zonal summary time series comprises a time series of NDVI values; 3) for each field in the geographic region, i) determining a crop type of the field, ii) counting the number of peaks in the NDVI time series during the predetermined time period, iii) determining the number of peaks in the NDVI time series during winter months of the predetermined time period, iv) estimating the length of spring by calculating the number of days between the day of year when NDVI reaches 15% of the normalized amplitude of the last NDVI peak of during determined time period and the day of year when NDVI reaches 50% of the normalized amplitude of the last NDVI peak of during determined time period, v) calculating a winter greenness value; 4) for fields of each crop type within the same county, calculating the median NDVI time series across all fields of the crop type; and 5) for each field in the county, applying a decision tree classifier to a field, wherein a field is predicted not to have a cover crop if i) fewer than two peaks in NDVI are detected during the predetermined time period and the winter greenness is less than a threshold greenness, or ii) fewer than two peaks in NDVI are detected during the predetermined time period and the winter greenness value is greater than a threshold greenness and the estimated length of spring is less a threshold number of days, or iii) fewer than two peaks in NDVI are detected during the predetermined time period and the determined crop type is winter wheat; and a field is predicted to have a wintergreen cover crop if i) fewer than two peaks in NDVI are detected during the predetermined time period and the winter greenness value is greater than a threshold greenness and the estimated length of spring is greater a threshold number of days and the determined crop type is not winter wheat, or ii) at least two peaks in NDVI are detected during the predetermined time period and the winter greenness value is greater than a threshold greenness, or iii) the Euclidean distance between NDVI time series for the field and the median NDVI time series across all fields of the crop type and within the same county is greater than or equal to a threshold distance; and a field is predicted to have a winterkill cover crop if i) at least two peaks in NDVI are detected during the predetermined time period and the winter greenness is less than a threshold greenness, or ii) the Euclidean distance between NDVI time series for the field and the median NDVI time series across all fields of the crop type and within the same county is greater than or equal to a threshold distance. In some aspects, the time series of satellite imagery comprises satellite imagery from one or more Landsat, Sentinel-2, and MODIS. In some aspects, the geographic region is one or more states, counties, farms, or fields. In some aspects, cloud or snow pixels are removed from the time series of satellite imagery. In some aspects, observations of the field level zonal summary time series having less than 85% of available pixels are removed from the analysis. In some aspects, the field level zonal summary time series are interpolated at daily time resolution using a Savitzky-Golay filter. In some aspects, the crop type is a summer crop and the winter months comprise the months starting with a month following the end of the crop season for the crop type and ending with a month after the beginning of the following crop season for the crop type. In some aspects, the winter months comprise November, December, January, February, March, and April. In some aspects, the winter months comprise December, January, February, and March. In some aspects, the summer crop is one or more of corn, soybean, barley, cotton, oats, peanuts, rye, rice, sorghum, or spring wheat. In some aspects, the crop type is a winter crop and the winter months comprise the months starting with a month after the beginning of planting season for the crop type and ending with a month before harvest for winter crops. In some aspects, the winter months comprise the months September through March. In some aspects, the winter crop is winter wheat. In some aspects, the winter greenness value is the 10th percentile of NDVI values over the winter months. In some aspects, the winter greenness value is 90th percentile of NDVI values over the winter months. In some aspects, the threshold number of days is 30 days. In some aspects, the threshold distance is 2. In some aspects, the crop season is determined by a crop type and hemisphere in which the geographic region is located.

In another aspect, the invention provides a method of predicting a date of spring emergence of a cover crop, the method comprising: 1) receiving a time series of satellite imagery, the time series of satellite imagery covering at least a geographic region, during a predetermined time period, wherein the predetermined time period begins with the end of a first crop season and ends with the end of the following crop season; 2) generating a first set of field level zonal summary time series from the time series of satellite imagery for at least one field within the geographic region, wherein the field level zonal summary time series comprises a time series of NDVI values; and 3) for each field in the geographic region: i) counting the number of peaks in the NDVI time series during the predetermined time period, and ii) determining the day of year when NDVI reaches 50% of the normalized amplitude of the increasing side of the first detected peak.

In another aspect, the invention provides a method of predicting a date of termination of a cover crop, the method comprising: 1) receiving a time series of satellite imagery, the time series of satellite imagery covering at least a geographic region, during a predetermined time period, wherein the predetermined time period begins with the end of a first crop season and ends with the end of the following crop season; 2) generating a first set of field level zonal summary time series from the time series of satellite imagery for at least one field within the geographic region, wherein the field level zonal summary time series comprises a time series of NDVI values; and 3) for each field in the geographic region: i) counting the number of peaks in the NDVI time series during the predetermined time period, and ii) determining the day of year when NDVI reaches 50% of the normalized amplitude of the decreasing side of the first detected peak.

In another aspect, the invention provides a method for generating a graphical user interface (GUI), the method comprising: 1) receiving a request to predict a regenerative agricultural practice for a geographic region from a client device; 2) in response to the request, generating a prediction of a regenerative agricultural practice; 3) generating a GUI interface for display by the client device comprising at least one predicted regenerative agricultural practice for the geographic region. In some aspects, the request is triggered by the occurrence of an environmental event. In some aspects, the environmental event comprises one or more of excess precipitation, insufficient precipitation, type of precipitation, high temperature, or low temperature. In some aspects, an excess of precipitation is determined by the number of days of precipitation within a period of time (for example, a prior month, quarter or year). In some aspects, an insufficiency of precipitation is determined by the number of days of precipitation within a period of time. In some aspects, the type of precipitation is rain, sleet, hail or snow. In some aspects, the occurrence of an environmental event observed is infrequent based on historical records. In some aspects, the magnitude of an environmental event observed is extreme for a date and or region based on historical records. In some aspects, the environmental event is a flood, a drought, a heatwave, a freeze, or a frost. In some aspects, the request is triggered by the occurrence of an environmental event within a geographic region. In some aspects, the request is triggered by the occurrence of an environmental event within a geographic region different from the geographic region for which the request to predict a regenerative agricultural practice is received. In some aspects, the request is triggered by the proximity of a user of a client device to the geographic region for which the request to predict a regenerative agricultural practice is received. In some aspects, the proximity of a user of a client device to the geographic region is identified by a GPS location of the user's client device. In some aspects, the request is triggered by receiving a notification from the user's mobile device that the user is within a specified distance of the one or more fields in the geographic region. In some aspects, the request is received from the client device of an insurance carrier or agent. In some aspects, the request is received from the client device of a buyer or trader of agricultural crops. In some aspects, the request is received from the client device of a producer of agricultural crops. In some aspects, the request is received from the client device of a manufacturer, distributor or seller of a crop input. In some aspects, the request is received from the client device of a consumer of agricultural crops. In some aspects, the request is triggered by a user of a client device scanning or imaging a code. For example, a code may be a bar code, a QR code, an image, a design, a number, a product label or packaging, a biological marker (for example, a DNA bar code), etc. In some aspects, the code is located on an agricultural product or near the point of sale of an agricultural product. In some aspects, the code is on retail consumer packaging of an agricultural product. In some aspects, the client device is a smartphone, tablet, or computer. In some aspects, the geographic region comprises the production location of an agricultural crop used to produce a consumer good. In some aspects, the geographic region comprises the production location of an insured agricultural crop. In some aspects, the prediction of a regenerative agricultural practice comprises predicting a tillage practice according to any method disclosed herein. In some aspects, the prediction of a regenerative agricultural practice comprises predicting a date of a tillage event according to any method disclosed herein. In some aspects, the prediction of a regenerative agricultural practice comprises predicting a cover crop practice according to any method disclosed herein. In some aspects, the prediction of a regenerative agricultural practice comprises predicting a date of spring emergence of a cover crop according to any method disclosed herein. In some aspects, the prediction of a regenerative agricultural practice comprises predicting a date of termination of a cover crop according to any method disclosed herein. In some aspects, the at least one predicted regenerative agricultural practice for the geographic region is a frequency of utilization of a regenerative agricultural practice. In some aspects, the prediction of a regenerative agricultural practice comprises predicting more than one regenerative practice (for example, tillage or cover crop utilization) according to any method disclosed herein. In some aspects, the generated GUI interface comprises at least one predicted regenerative practice displayed within a map of the geographic region. In some aspects, the generated GUI interface additionally comprises a prompt requesting user input to confirm presence or absence of one or more predicted regenerative practices within the geographic region. In some aspects, the generated GUI interface additionally comprises at least one predicted regenerative practice displayed within a map of the geographic region and directions to one or more map locations updated in real-time in response to the location of the client device. In some aspects, the request is triggered solely by the proximity of a client device to the geographic region and the generated GUI interface additionally comprises a prompt to the user to confirm presence or absence of one or more regenerative practices in fields within the geographic region. In some aspects, the method is applied to more than one client device within a specified distance of the one or more fields in the geographic region. In some aspects, users' responses to prompts prompts are verified by comparison to other user responses.

According to embodiments of the present disclosure, methods of and computer program products for detecting a tillage event are provided. Based on a time-series of satellite imagery, one or more dormancy period of a cultivated area is identified. Identifying the one or more dormancy period comprises determining a period in which a vegetation index of the cultivated is below a threshold. Within the one or more dormancy period, a residue cover index of the cultivated area is determined. The residue cover index is provided to a trained classifier, and an indication is received therefrom of the presence or absence of a tillage event.

In some embodiments, the vegetation index is NDVI. In some embodiments, the threshold is 0.3. In some embodiments, the threshold is predetermined according to historical data.

In some embodiments, the residue cover index is NDTI. In some embodiments, the residue cover index is a minimum value of NDTI within the one or more dormancy period.

In some embodiments, one or more of: a vegetation index, an indication of soil moisture, or a drop in residue cover index is provided to the trained classifier.

In some embodiments, the classifier is a decision tree.

According to embodiments of the present disclosure, methods of and computer program products for detecting a cover crop are provided. Based on a time-series of satellite imagery, a plurality of peaks in a vegetation index is determined. For a candidate peak, a first inflection point between the candidate peak and a preceding peak and a second inflection point between the candidate peak and a subsequent peak are determined. Summary statistics are determined for each of a plurality of time segments between the first inflection point and the candidate peak and between the second inflection point and the candidate peak. The summary statistics are provided to a trained classifier, and receiving therefrom an indication of the present or absence of a cover crop at the candidate peak.

In some embodiments, the vegetation index is NDVI.

In some embodiments, the plurality of time segments comprise one or more of: a segment extending from the first inflection point to 15% of the normalized amplitude of the candidate peak, a segment located between the first inflection point and the candidate peak, extending from 15% of the normalized amplitude of the candidate peak to 50% of the normalized amplitude of the candidate peak, a segment located between the first inflection point and the candidate peak, extending from 50% of the normalized amplitude of the candidate peak to 85% of the normalized amplitude of the candidate peak, a segment extending from the second inflection point to 15% of the normalized amplitude of the candidate peak, a segment located between the second inflection point and the candidate peak, extending from 15% of the normalized amplitude of the candidate peak to 50% of the normalized amplitude of the candidate peak, a segment located between the second inflection point and the candidate peak, extending from 50% of the normalized amplitude of the candidate peak to 85% of the normalized amplitude of the candidate peak.

In some embodiments, the summary statistics comprise one or more of: a rate of change in the vegetation index, a duration, a maximum value of the vegetation index, an average value of the vegetation index, a median value of the vegetation index, a 90% percentile value of the vegetation index.

In some embodiments, the trained classifier is a random forest, k-nearest neighbor, or XGBoost classifier.

DETAILED DESCRIPTION

Figure 1A:
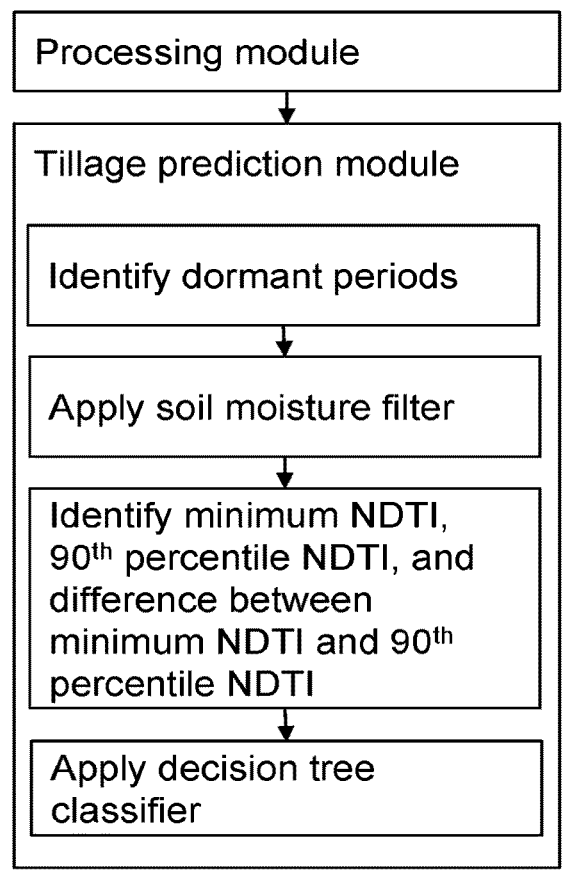
FIG. 1A shows an exemplary embodiment of a method to predict the tillage status of land. For example, a processing module may comprise steps including without limitation cleaning, filtering, smoothing, summarizing, normalizing, or interpolating missing values in an input data source (for example, time series of satellite imagery, time series of soil properties, time series of weather data, etc.). For example, a tillage prediction module may comprise operations of identifying dormant periods, filtering observations or time series based on soil moisture values, identifying one or more dormant periods, calculating NDTI values during a dormant period, and applying a decision tree classifier.
Figure 1B:
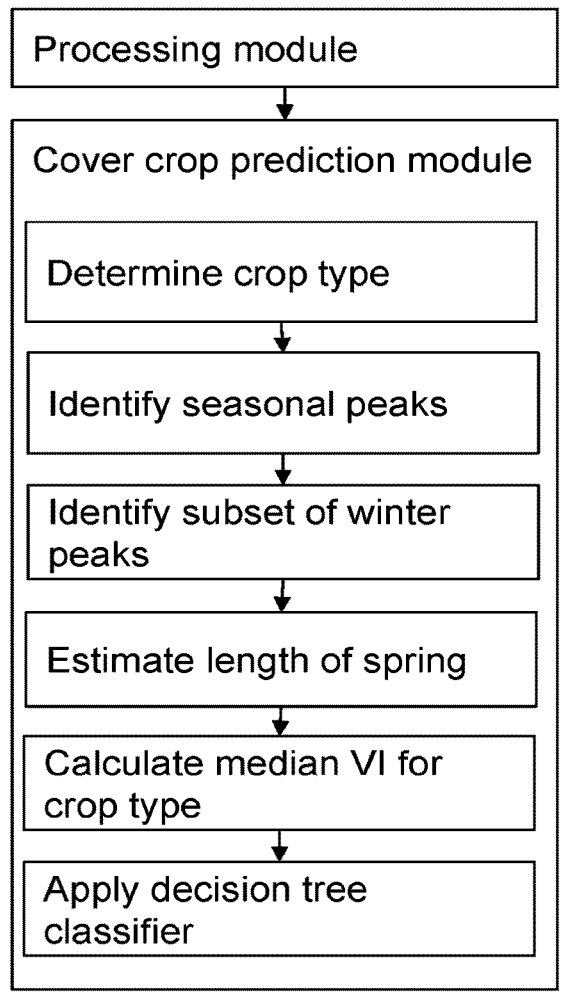
FIG. 1B shows an exemplary embodiment of a method to predict cover crop utilization of land. For example, a cover crop prediction module may comprise operations of identifying seasonal periods (for example, identifying winter or spring periods based on a crop type and geographic location, determining the length of a seasonal period (for example, number of spring days), etc.), identifying or normalizing or filtering peaks in one or more time series of input data, determining vegetative index values (for example, NDVI) for a geographic region for which prediction will be made and for nearby regions (for example, for a county containing a field to which the method is applied), generating summary statistics of vegetative index time series (for example, median NDVI) for a geographic region for which prediction will be made and for nearby regions, and applying a decision tree classifier.
Figure 2:
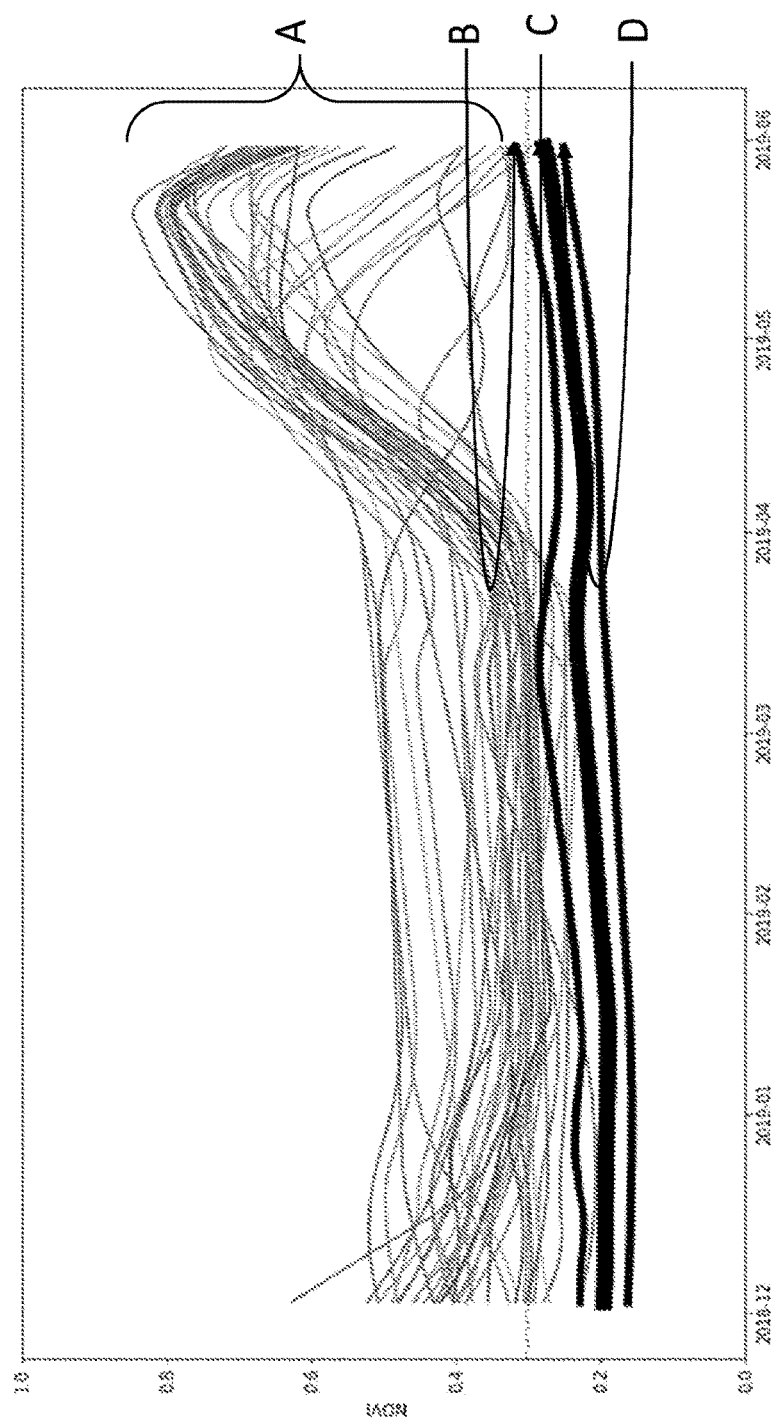
FIG. 2 shows an example of fields with a high likelihood of cover crop detection (A). The plotted NDVI values of these fields over time show elevated winter greenness and an additional detected peak when compared with the black lines representing the $10^{th}$ (D), $50^{th}$ (C) and $90^{th}$ (B) percentile NDVI across all corn pixels in Delaware County, MN between Dec. 1, 2018 and Jun. 1, 2019.

A variety of acronyms are used herein as known in the art. These include CDL (Cropland Data Layer), HLS (Harmonized Landsat Sentinel), SMAP (Soil Moisture Active Passive), NDVI (Normalized Difference Vegetation Index), NDTI (Normalized Difference Tillage Index), SWIR (shortwave infrared), DOY (Day of Year).

The pigment in plant leaves, chlorophyll, strongly absorbs visible light (from 0.4 to 0.7 μm) for use in photosynthesis. The cell structure of the leaves, on the other hand, strongly reflects near-infrared light (from 0.7 to 1.1 μm). The more leaves a plant has, the more these wavelengths of light are affected, respectively. NDVI is calculated from the visible and near-infrared light reflected by vegetation. Healthy vegetation absorbs most of the visible light that hits it, and reflects a large portion of the near-infrared light. Unhealthy or sparse vegetation reflects more visible light and less near-infrared light. Accordingly, the NDVI is computed as near-infrared radiation minus visible radiation divided by near-infrared radiation plus visible radiation, or (NIR−Red)/(NIR+Red).

The NDTI is computed as (SWIR1−SWIR2)/(SWIR1+SWIR2). In exemplary embodiments utilizing Sentinel-2 MSI, Red, NIR, SWIR1, and SWIR2 represent bands 4, 8, 11, and 12, respectively. Spectral characteristics of the 2A and 2B sensors onboard the Sentinel-2 satellite are given below.

| Band Number | S2A Central wavelength (nm) | Band width (nm) | S2B Central wavelength (nm) | Band width (nm) | Spatial resolution (m) | Name |
| --- | --- | --- | --- | --- | --- | --- |
| 1 | 442.7 | 21 | 442.2 | 21 | 60 | — |
| 2 | 492.4 | 66 | 492.1 | 66 | 10 | Blue |
| 3 | 559.8 | 36 | 559 | 36 | 10 | Green |
| 4 | 664.6 | 31 | 664.9 | 31 | 10 | Red |
| 5 | 704.1 | 15 | 703.8 | 16 | 20 | — |
| 6 | 740.5 | 15 | 739.1 | 15 | 20 | — |
| 7 | 782.8 | 20 | 779.7 | 20 | 20 | — |
| 8 | 832.8 | 106 | 832.9 | 106 | 10 | NIR |
| 8a | 864.7 | 21 | 864 | 22 | 20 | — |
| 9 | 945.1 | 20 | 943.2 | 21 | 60 | — |
| 10 | 1373.5 | 31 | 1376.9 | 30 | 60 | — |
| 11 | 1613.7 | 91 | 1610.4 | 94 | 20 | SWIR1 |
| 12 | 2202.4 | 175 | 2185.7 | 185 | 20 | SWIR2 |

Processing Module

The processing module fetches and processes data from the original source (publicly available remote sensing, weather, crop, and soil moisture data), through a zonal summary engine which performs a spatial reduce step, and finally through the algorithms which generate product outputs.

Tillage Prediction Module

The tillage algorithm uses statistical inference to determine whether a field has been tilled.

Detecting tillage events with remote sensing relies on an ability to observe residue cover on fields. Fields with residue cover absorb more shortwave infrared (SWIR) radiation than bare soil, with greater absorption at longer SWIR wavelengths. The Normalized Difference Tillage Index (NDTI), which can be calculated with Landsat, Sentinel-2, and MODIS data, among others, can characterize this absorption feature of residue, allowing fields with residue (high NDTI) to be separated from fields with bare soil (low NDTI). However, a number of issues with detecting tillage events with NDTI.

First, NDTI is not sensitive to residue when green vegetation is present. When green vegetation is present on a field, NDTI is no longer sensitive to the amount of residue cover, as healthy green vegetation absorbs strongly in the short wave infrared (SWIR) portion of the spectrum (approximately 1400-3000 nm wavelength). In some embodiments, the methods described here address this by detecting till events when green vegetation cover is low. In some embodiments, by identifying and predicting tillage events during "dormant periods" where at least 2 consecutive observations have NDVI<0.3. In various embodiments, till events are only detected within these dormant periods. In various embodiments, if NDVI jumps above 0.3 for a single observation, then the observation is masked to prevent a single noisy observation from breaking up a dormant period. Dormant periods are optimally at least two weeks (alternatively, at least one month) in length, with calculated dormant periods typically spanning from harvest to planting the following year. If a cover crop is planted, there may be a dormant period on either side of the cover crop. In various embodiments, till events are detected in either or both dormant period.

An additional challenge is NDTI is strongly influenced by soil moisture. As water has strong absorption features in the SWIR bands, NDTI can be significantly influenced by soil moisture. This causes tilled fields with bare soil to resemble fields with high residue cover when fields are wet. In some embodiments, the methods described here address this by using soil moisture estimates from NASA's Soil Moisture Active Passive (SMAP) mission to screen NDTI observations on days when soil moisture is greater than a threshold percentage. In some embodiments, the threshold percentage is greater than 30%, 35%, 40%, 45%, or 50%. SMAP data are available from 2015 to the present at 9 km spatial resolution and a two day temporal frequency (although gaps exist). Once observations with high soil moisture are removed, a field is flagged as too wet to predict in the given year if fewer than two dry observations remain or a gap of more than 100 days between dry observations was created. In various embodiments, a field is considered high moisture is the moisture level is greater than the threshold for more than 75%, 80%, 85%, 90%, 95% of observations during the dormant period or for all observations during the dormant period. In some embodiments, the threshold percentage is equal to or greater than 40% soil moisture. In some embodiments, the threshold percentage is equal to or greater than 40% soil moisture and fields are too wet to predict tillage practices if all of the observations have greater than the threshold percentage of soil moisture. The percentage soil moisture values or "soil moisture scores" are recorded for each dormant period, even where the soil moisture value is less than the threshold value (for example, <40%) as soil moisture values less than the threshold can still influence NDTI. The soil moisture score is recorded for each dormant period and later used to assess the quality of the till/no-till detection.

An additional challenge is atmospheric contamination can resemble a till event. NDTI can decrease and resemble a till event if an observation is contaminated by clouds or other atmospheric effects. While most clouds/noise are removed by preprocessing steps, a number of contaminated observations can remain in the time-series leading to false detection of till events. In some embodiments, the methods described herein screen for contaminated NDTI observations by identifying and removing from further analysis NDTI observations that deviate strongly from both the observation before and after the image (which may be referred to as despiking). Another factor which may be monitored for detecting contaminated observations is that residue cover should not increase in the winter. In another embodiment, the methods described herein screen for contaminated NDTI observations by identifying abrupt increases in NDTI between images, and flagging these observations and or removing then from further analysis. NDTI should only increase in this way following a till event if soil moisture increases. Therefore, if NDTI increases by >0.05 between observations and <5 mm of rain was recorded between observations, we remove the low NDTI observation.

In some embodiments, inputs to the tillage prediction model include NDTI and NDVI. In some embodiments, these indices are prepared by the following steps. Field-level zonal summary time series are generated for NDTI and NDVI. Observations are screened for snow using the Normalized Difference Snow Index (NDSI). Specifically, observations where NDSI is >0 are screened and removed from the analysis. Observations with <85% of available pixels are removed to prevent partially contaminated images from being included. Observations are "despiked", if an image is a spike in either NDVI or NDTI, the image is removed for both.

Inputs to the tillage prediction model also include soil moisture data, precipitation data, and a crop type data layer. Soil moisture data may be obtained, for example, from SMAP. County- or field-level zonal summaries are calculated and interpolated to obtain time series of daily observations. Field-level zonal summary time series are generated for daily observations of precipitation. Field-level zonal summary time series of crop type are generated, for example from the USDA Cropland Data Layer (CDL), which provides annual predictions of crop type.

A "crop type data layer" is a data layer containing a prediction of crop type, for example USDA Cropland Data Layer provides annual predictions of crop type, and a 30 m resolution land cover map is available from MapBiomas (https://mapbiomas.org/en). A crop mask may also be built from satellite-based crop type determination methods, ground observations including survey data or data collected by farm equipment, or combinations of two or more of: an agency or commercially reported crop data layer (e.g. CDL), ground observations, and satellite-based crop type determination methods. Field-level zonal summary time series of crop type are generated.

The tillage prediction model features as described above are shown below in Table 1.

TABLE 1

| Tillage prediction model features | |
|---|---|
| Parameter | Description |
| till_class | Binary classification of till vs no till on an annual basis |
| model_type | The model type run. Four exemplary model types are described below: primary, primary_uncalibrated, usda backup, and global_backup. |
| ndti_min_date | Date on which NDTI was minimum, representing our best estimate of tillage date (but is strongly influenced by observation density) |
| start_date | Annual start date for searching for till events. For all crops besides winter wheat, this corresponds to September 1 of the previous year. For winter wheat, it corresponds to May 1 of the previous year. Date windows are determined using the CDL crop label from the previous year, not the current year. |
| end_date | Annual end date for searching for till events. For all crops besides winter wheat, this corresponds to August 31 of the target year. For winter wheat, this corresponds to April 31 of the target year |

TABLE 1-continued

| Tillage prediction model features | |
|---|---|
| Parameter | Description |
| period_start | First date of the dormant period. If multiple dormant periods exist, the one with the lowest recorded NDTI is reported, as this period is most likely to have a till event. |
| period_end | Last date of the dormant period |
| num_obs | Total number of clear observations between start_date and end_date |
| max_gap | Maximum gap in days between images. If large gaps exist, a till event might be missed. As January/February typically have low observation density and low probability of till events, gaps during these months are not counted. |
| num_obs_period | Total number of clear observations during dormant period |
| max_gap_period | Maximum gaps in days during dormant period. Again, gaps in January/February are not counted. |
| smap_period | Average soil moisture on observation dates during the dormant period (as a proportion) |
| ndti_min | Minimum NDTI during the dormant period. This is the only input to certain decision tree classifiers, as discussed below. |
| ndti_drop | Difference between minimum NDTI and the 90th percentile of NDTI from 2013-2020. Only dormant period observations are used to calculate. This is a measure of how much NDTI dropped during the dormant period, and is used in the global_backup model, described below. |
| crop_class | CDL class for the previous growing season (used to determine start_date and end_date and which model is applied) |
| data_quality | A data quality flag that incorporates max_gap, max_gap_period, and smap_period (described in Table 2) |
| error_code | If tillage could not be predicted for a given year, an error code is logged for why it could not be predicted (e.g., too few observations, no dormant period, too wet). |

Data quality flags are generated and used as model features. It will be recognized that the flag labels are immaterial and the particular values for features that define each flagged category are approximate and may be modified depending on data availability and model performance. Fields with missing SMAP data may be given alternate data quality scores based solely on max_gap and max_gap_period (Table 2). For example, fields that were missing SMAP but otherwise meet the description of the "Excellent" flag were assigned data_quality=1.5, fields that were missing SMAP but otherwise meet the description of the "Good" flag were assigned data_quality=2.5, fields that were missing SMAP but otherwise meet the description of the "Moderate" flag were assigned data_quality=3.5, and so forth. The data quality flags as described above are shown below in Table 2.

TABLE 2

| Data quality flags | |
|---|---|
| Flag label | Description |
| Excellent (data_quality = 1) | max_gap < 50 days, max gap period < 20 days, smap_period < 25% Alternatively, max_gap < 50 days, max_gap_period < 20 days, smap_period < 35% Excellent, but missing SMAP (data_quality = 1.5) |
| Good (data_quality = 2) | max_gap < 70 days, max_gap_period < 40 days, smap_period < 30% Alternatively, max_gap < 70 days, max_gap_period < 40 days, smap_period < 35% |

TABLE 2-continued

Data quality flags

| Flag label | Description |
|---|---|
| | Good, but missing SMAP (data_quality = 2.5) |
| Moderate (data_quality = 3) | max_gap < 90 days, max_gap_period < 60 days, smap_period < 40% Alternatively, max_gap < 90 days, max_gap_period < 60 days, smap_period < 35% |
| | Moderate, but missing SMAP (data_quality = 3.5) |
| Poor (data_quality = 4) | max_gap < 110 days, max_gap_period < 80 days, smap_period < 40% |
| | Poor, but missing SMAP (data_quality = 4.5) |
| Very Poor (data_quality = 5) | max_gap > 110 days, max_gap_period > 80 days, smap_period > 40% |
| Not predicted (data_quality = 6) | |

In various embodiments, models generate error codes where the input data are insufficient. For example, exemplary error codes and conditions are provided in Table 3.

TABLE 3

Error Codes

| Error Code | Description |
|---|---|
| Observation density too low (error_code = 1) | Observation density is low enough that a dormant period might be completely missed |
| Field too green to predict (error_code = 2) | Either no dormant period observed, or the only dormant period was <1 month |
| Observation density too low during dormant period (error_code = 3) | |
| Soil moisture too high to predict >40% (error_code = 4) | |

Figure 8:
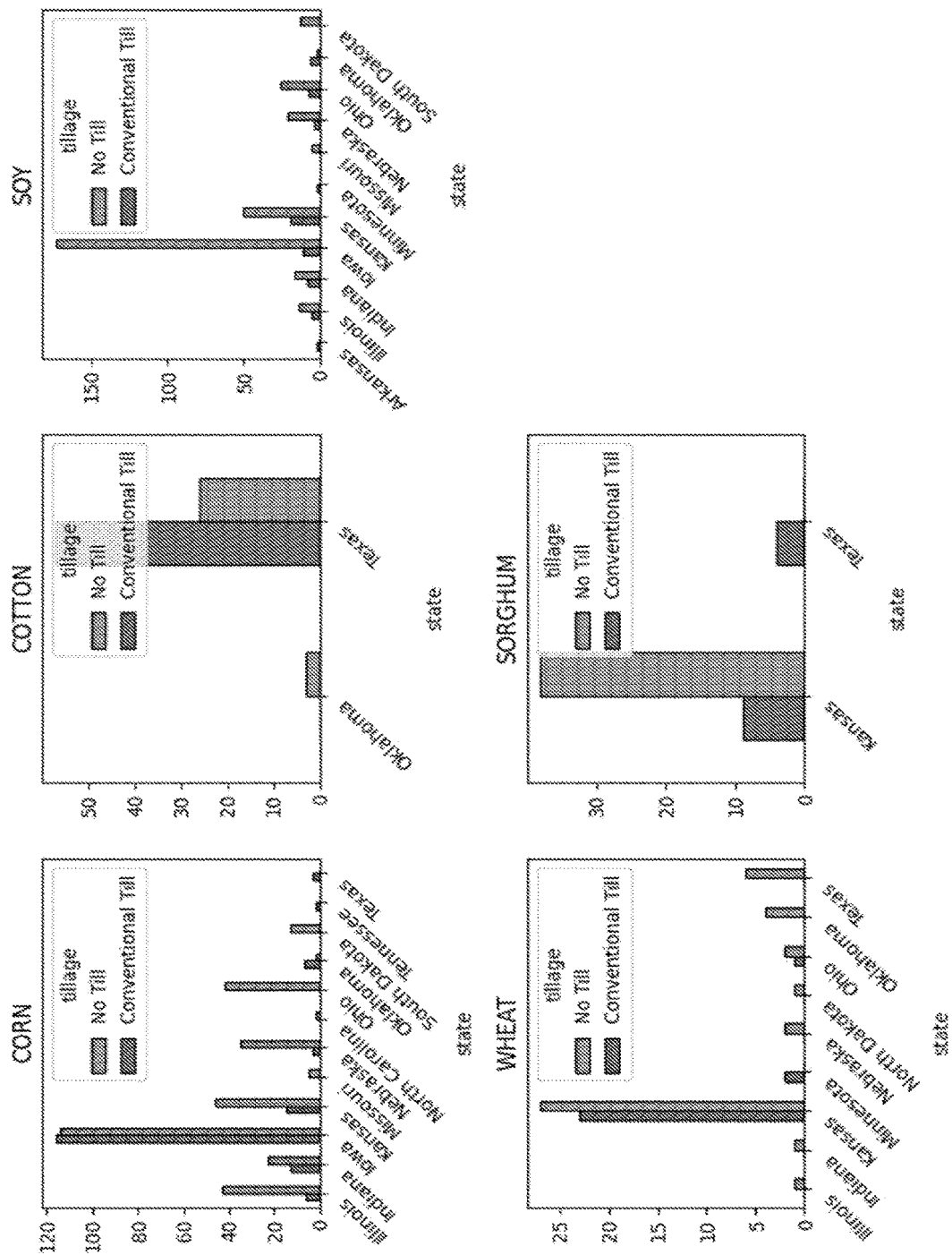
FIG. 8 shows exemplary data available for model training according to embodiments of the present disclosure.
Figure 9:
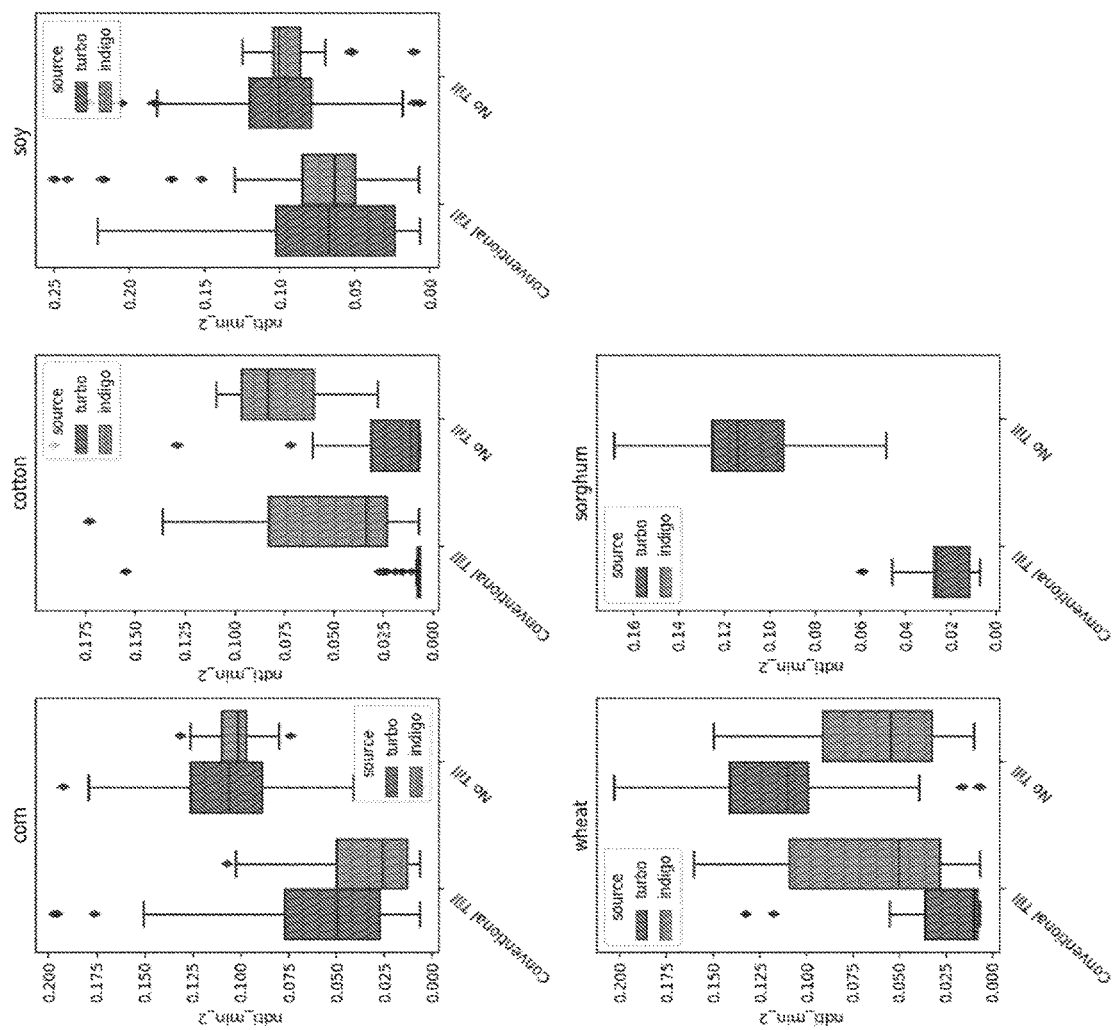
FIG. 9 shows NDTI observations occurring during dormant periods according to embodiments of the present disclosure.

In some embodiments, NDTI from the Harmonized Landsat Sentinel (HLS) dataset are used to classify fields as tilled or not tilled on an annual basis. For fields that are detected as tilled, an estimated tillage date is assigned to the date when NDTI is lowest. In one example, two NDTI features are used to classify fields as tilled or not tilled fields during each year: the minimum NDTI and the difference between the minimum NDTI and the 90th percentile of NDTI from historical data (for example, NDTI from 2013-2020). Only NDTI observations occurring during dormant periods (FIG. 9) are used to calculate minimum NDTI and the 90th percentile of NDTI. If multiple dormant periods exist in a single year, the dormant period with the lowest NDTI minimum is used. As till events occur between harvest and planting, the annual window for calculating minimum NDTI is set based on harvest and planting practices in the geographic region. For example, the annual window for calculating minimum NDTI for summer crops in North America was set between September 1st of the previous year to August 31st of the current year (e.g., Sept. 2013 to Sept. 2014 for the 2014 product year). The window was shifted to May 1st to April 31st for fields planted with winter wheat in the previous year. In order to determine thresholds for the two model features, thresholds were chosen that maximized accuracy against the field datasets while maintaining high correspondence with state-level adoption rates. This resulted in a decision tree classifier where a field was mapped as tilled if minimum NDTI was <0.05 or the difference between minimum NDTI or the 90th percentile of NDTI was >0.09. Detailed results are shown in FIG. 8

Figure 10:
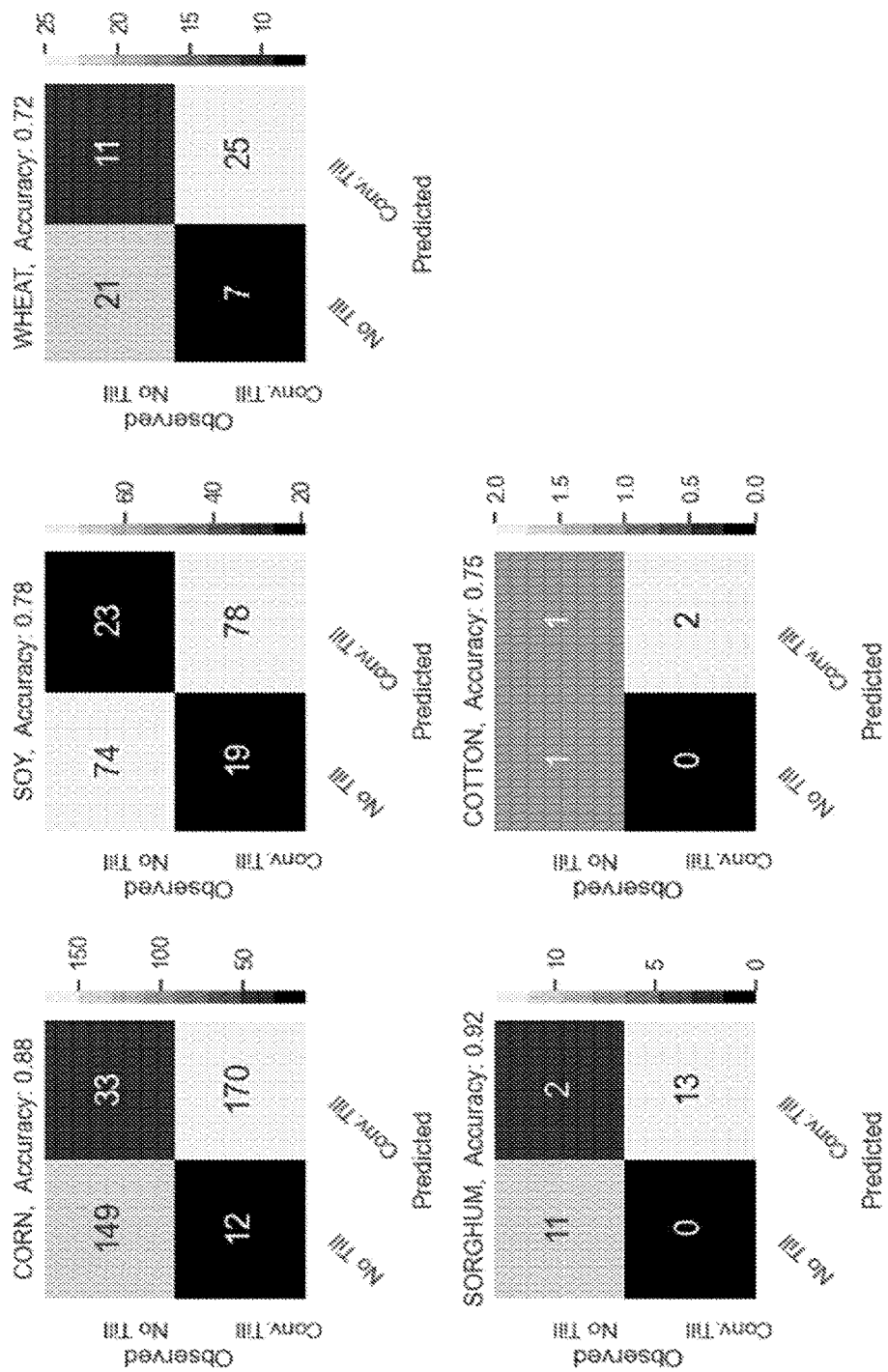
FIG. 10 shows the separation of ndti_min between Conventional Till and No Till for each crop according to embodiments of the present disclosure.

In this example, the tillage prediction module applied to the data described above resulted in greater than 70% accuracy for all models and crops. The model trained for corn, soy, sorghum, and winter wheat was applied correctly predicted tillage practice status (no tillage or conventional tillage) on 319 of 364 corn fields (88%), 152 of 194 soy fields (78%), 46 of 64 winter wheat fields (72%), and 24 of 26 sorghum fields (92%), for an overall accuracy rate of 83%. Detailed results are shown in FIG. 10.

Figure 11:
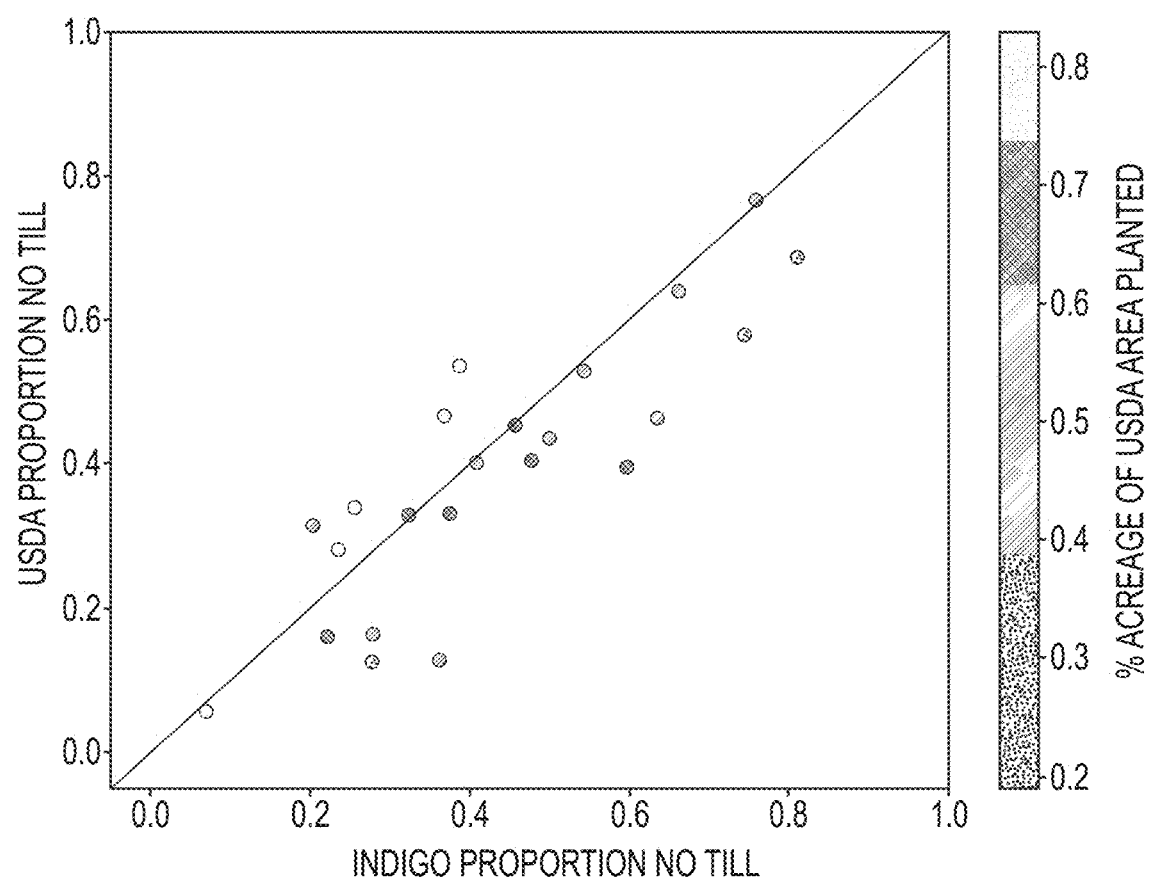
FIG. 11 shows a comparison of tillage practice predictions generated for soy and corn using methods of the present disclosure to tillage practice results reported in the 2017 USDA Census data for Corn and Soybeans.

FIG. 11 shows a comparison of tillage practice predictions generated for soy and corn using methods of the present disclosure to tillage practice results reported in the 2017 USDA Census data for Corn and Soybeans. The results are highly correlated, demonstrating the accuracy of the disclosed methods.

Figure 12:
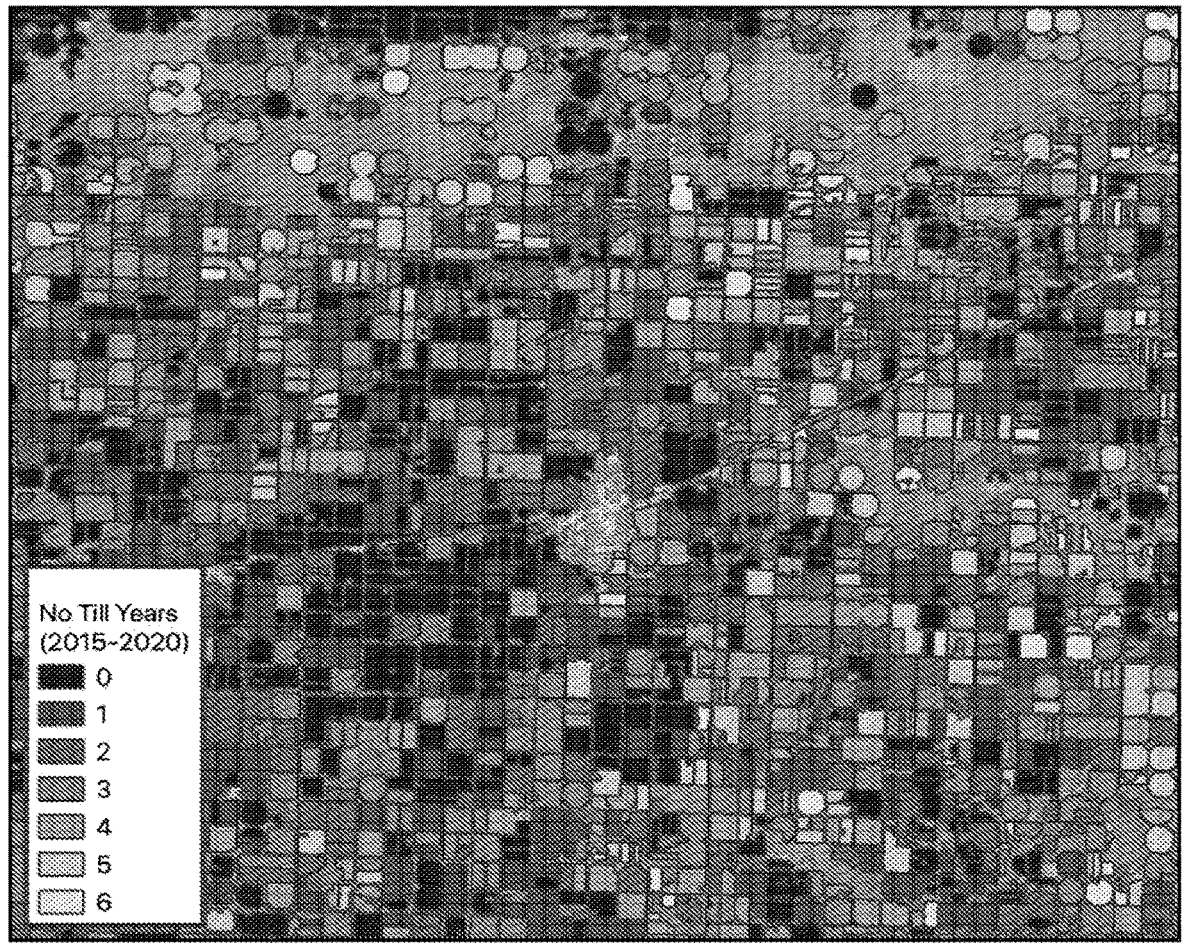
FIG. 12 provides example results for Kearney county, Nebraska according to embodiments of the present disclosure.

In some embodiments, the methods of the present invention can be applied to historical data to generate an estimation of the number of years individual fields have utilized no-till practices. An example of such results for Kearney county Nebraska is shown in FIG. 12, which shows the predicted number of years from 2015 to 2020 that individual fields have been under no-till management.

In various embodiments, different model types can be applied to make a tillage prediction, with the choice of model type determined by data availability for model training. Four particular model types are described below: the primary model, the primary_uncalibrated model, the USDA_ backup model, and the global_backup model.

Primary Model

The primary tillage model is a decision tree that is trained at the Crop Management Zone (CMZ) level using Turboscout and Agronomy field data sources. This model type is applied when two conditions are met: 1) there are sufficient training samples (>50 no-till and >50 tilled samples) across the CMZ and 2) Remote sensing data are available for all fields within the county. Field samples are first split into two groups: no-till samples and till samples.

No-till samples includes fields labelled as no-till that have >50% residue cover. Till samples include fields labelled as conventionally tilled that have <25% residue cover, or fields labeled as minimum tilled that have between 25-50% residue cover.

Within each CMZ, an equal number of training fields is subsampled from each group for model training. As Turboscout fields include estimates of residue cover, Turboscout fields are prioritized over Agronomy fields when subsampling. If >50 samples can be reached in each group with Turboscout data alone, then Agronomy data sources are not included for the CMZ. As residue cover on cotton fields is lower than other crops, which affects our ability to detect tillage practices with remote sensing, cotton fields were removed before model training. Eventually, when sufficient cotton samples exist, a separate primary tillage model will be constructed for cotton.

Once an equal number of no-till and till samples are selected, the decision tree model is trained on a single feature: min_ndti (See Model Features, above). While min_ndti is typically calculated over the entire dormant period of a field, a shorter time period was required for calculating min_ndti for training fields, as it is possible for the condition of a field to change during the dormant period. For example, a Turboscout field may have been recorded as no-till at the time of visit on March 15th, but the field was later tilled before planting. If min_ndti was calculated over the full dormant period, min_ndti would capture the till event before planting, and the field would no longer represent a true no-till sample. Therefore, when calculating min_ndti for training fields, the dormant period end date was set to a maximum of two weeks following the field visit, which served as a compromise between obtaining additional remote sensing observations after the visit while limiting the chance that the condition of a field could change.

Inter-annual variability in soil moisture and RS observation density can lead to inter-annual variability in min_ndti, which can decrease prediction accuracy when predictions are made outside of the years used for model training. Therefore, prior to model application, min_ndti is first stabilized across years using county-level statistics. The underlying assumption of the approach is that county-level tillage adoption rates should not change drastically from one year to the next. Therefore, if the entire distribution of min_ndti shifts between years, this shift in the distribution is likely due to external factors influencing min_ndti. The goal of min_ndti stabilization is to remove large shifts in the county-level distribution of min_ndti between years. To accomplish this, min_ndti is first calculated for all fields in a county for each year that will be modeled (typically 2015-Present). Within each year, the 10th and 90th percentile of min_ndti across the county is calculated. The distribution of min_ndti is then scaled within each year until the 10th and 90th percentiles match those from 2020 (the primary year on which models were trained). This process ensures that the range of min_ndti is stabilized across years, while allowing the center of the distribution to vary. These scaling parameters are stored in the model file for each county, allowing the primary model to be applied to arbitrary fields within the county.

Primary Uncalibrated Model

In order to stabilize min_ndti across years, the primary model requires remote sensing data for all fields within a county. Wall-to-wall data is available for ~1500 counties across the US, which allows the min_ndti stabilization to be performed for most major crop producing counties. However, if tillage needs to be predicted for a field outside of these 1500 counties, or in counties where there are fewer than 100 fields, this stabilization cannot be performed. Therefore, the primary_uncalibrated model represents the scenario where a decision tree model can be applied (there are sufficient training data within the CMZ), but min_ndti cannot be stabilized first. Therefore, caution should be given to predictions with the primary_uncalibrated model type, especially in early years (2015-2017) where HLS observation density is lower, and min_ndti is less stable.

USDA Backup Model

When there is insufficient training data within a CMZ (<50 no-till fields or <50 tilled fields), but remote sensing data is available for all fields within the county, the USDA_backup is applied. This approach aims to optimize the min_ndti threshold at the county-level in order to achieve a direct match to the no-till rate reported by 2017 USDA Ag Census. Specifically, the min_ndti threshold is iteratively varied for each county, and the % of acres classified as no-till with each threshold is calculated. The threshold that achieves the closest match to the USDA Ag Census is then selected for each county. Using the same approach as the primary model, min_ndti is first stabilized across years before applying the min_ndti threshold to make predictions. However, in this model, the min_ndti range is matched to 2017 (the year of the Ag Census), instead of 2020.

Figure 18:
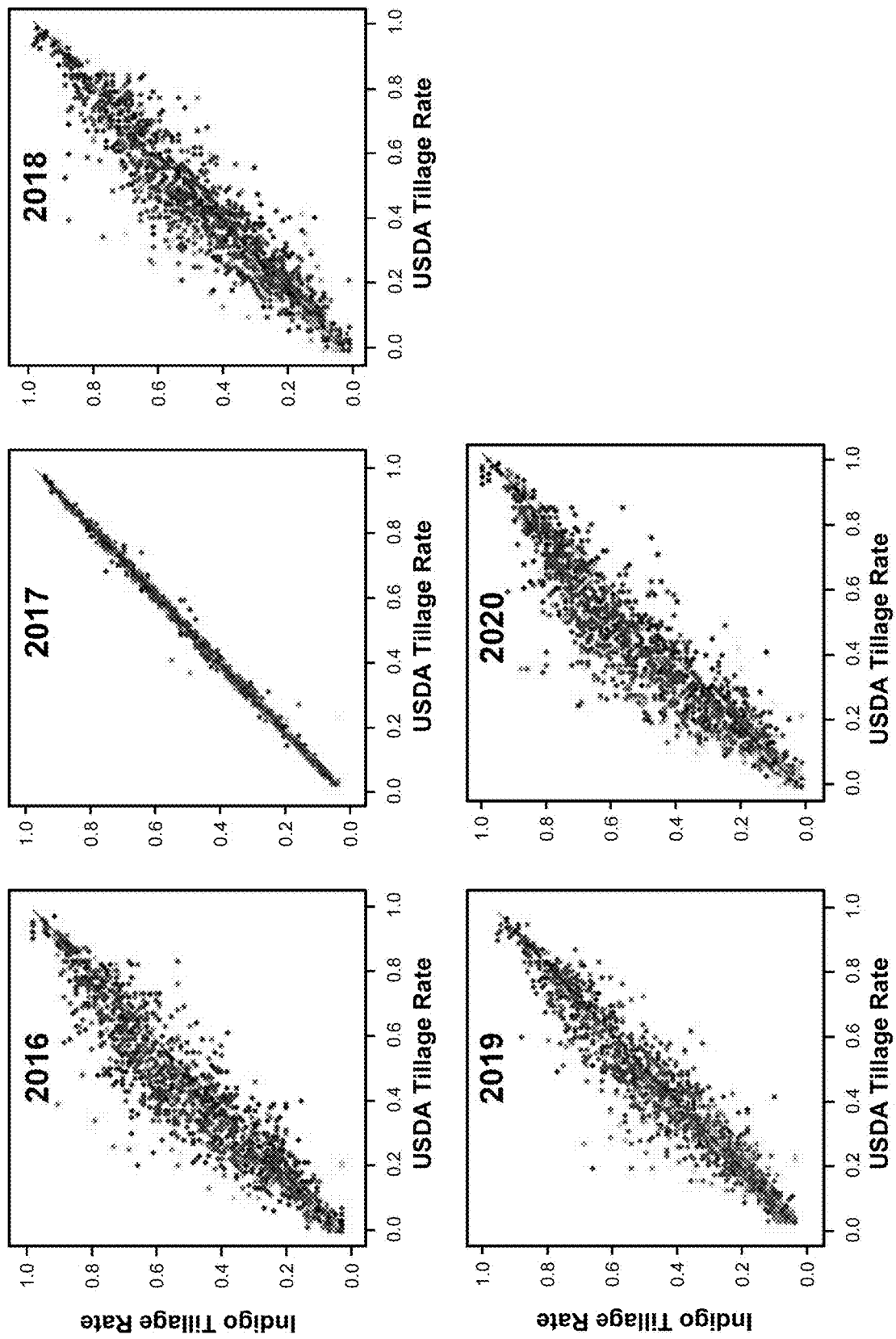
FIG. 18 shows a comparison is provided of county-level no-till rates against 2017 USDA Census data using the usda_backup model according to embodiments of the present disclosure.

Referring to FIG. 18, a comparison is provided of county-level no-till rates against 2017 USDA Census data using the usda_backup model. The near perfect match in 2017 is because 2017 is the year on which the calibration to the USDA Ag Census was performed.

Global Backup Model

When the primary, primary_uncalibrated, and usda_backup model cannot be applied, a global_backup model is applied, which consists of globally defined thresholds. In the global_backupmodel, a field is classified as tilled if min_ndti<0.05 or ndti_drop>0.09. Thresholds for the two model features were chosen which maximized accuracy against the field dataset while maintaining high correspondence with USDA state-level adoption rates in 2017.

FIG. 11 provides a comparison of state-level no-till rate against 2017 USDA Census data for Corn and Soybeans using the global_backup model. Colors show the % of USDA planted area that was assessed Field Data Two dataset were used for model training/testing (Indigo Fields and Turbo Window Scouting). To prevent overfitting models to the no till fields, an equal sample of till and no till fields were included in model training. It will be appreciated that certain crops may be particularly prone to overfitting, such as soy.

FIG. 8 shows data available for model training. 25% of fields were left out for model testing.

As set forth further above, in one example, two models were trained. A first model was trained for corn, soy, sorghum, and winter wheat, as these crops showed a similar separation in NDTI between no till and till. A separate model was trained for cotton, as NDTI for no till fields was significantly lower than other crops.

FIG. 10 shows the separation of ndti_min between Conventional Till and No Till for each crop. The two datasets are shown as different boxes.

FIG. 12 provides example results for Kearney county, Nebraska. The colors show the number of years of no till between 2015 and 2020.

Cover Crop Prediction Module

The cover crop algorithm analyzes seasonal time series of vegetation greenness indices, and historical crop type information, to determine whether a cover crop was grown on the field during the dormant season.

Figure 3:
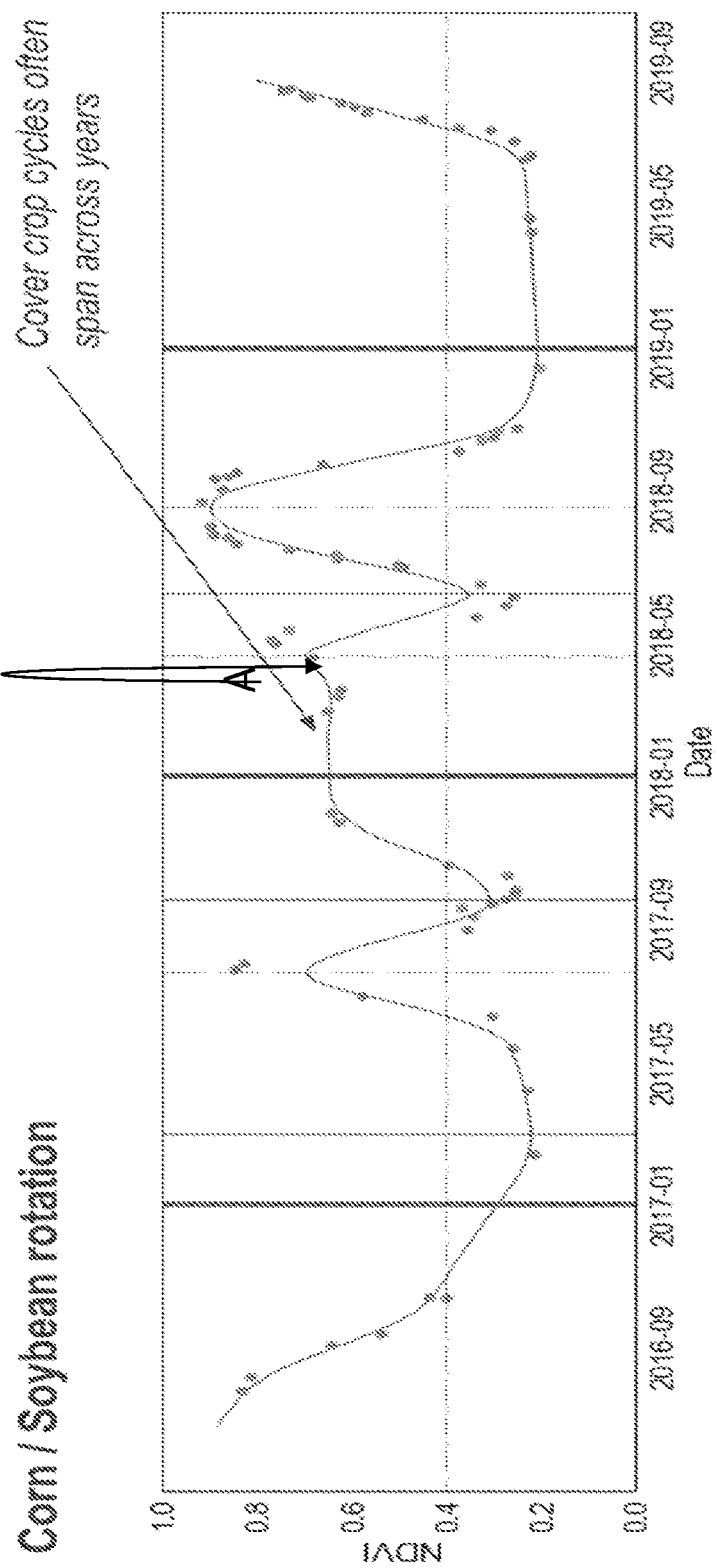
FIG. 3 shows an example of a cover crop in a rotation corn and soy, two summer crops. Cover crop cycles often span two calendar years as seen in this figure. Peaks (A) and valleys are denoted by thin dashed and continuous vertical lines, respectively (bold vertical lines signify change in calendar year).

Detection of cover crops from satellite remote sensing is largely based on the identification of seasonal changes in greenness beyond expected behavior associated with winter/summer commodity crops. In general, cover crops are most likely prevalent when wintertime greenness is anomalously high and at least one additional peak is detected between harvest and planting (an example of an additional peak is shown in FIG. 3, point A). Finally, in order to adjust for regional or interannual differences in winter climate which results in increased weed growth (and, therefore, relative overestimation of cover crop adoption), the Euclidean distance (in greenness) is measured between a given field and other fields of the same crop type within the same county during a single year.

Inputs to the cover crop prediction module include a vegetative index. A vegetative index ("VI") is computed from one or more spectral bands or channels of remote sensing data. Examples include simple ratio vegetation index ("RVI"), perpendicular vegetation index ("PVI"), soil adjusted vegetation index ("SAVI"), atmospherically resistant vegetation index ("ARVI"), soil adjusted atmospherically resistant VI ("SARVI"), difference vegetation index ("DVI"), normalized difference vegetation index ("NDVI"). NDVI is a measure of vegetation greenness which is particularly sensitive to minor increases in surface cover associated with cover crops. To prepare a vegetative index for use in the cover crop prediction module field-level zonal summary time series are generated. Observations with fewer than 5 cloud/snow-free pixels or less than 25% of all available pixels are removed, and time series are "de-spiked" using an outlier detection method and smoothed, for example using a Savitzky Golay filter.

In some embodiments, an additional input to the cover crop prediction module includes the USDA Cropland Data Layer ("CDL"). CDL provides annual predictions of crop type, which can be used to alter the logic imposed for detecting cover crops on a calendar basis (e.g., winter wheat vs. corn). An additional input to the cover crop prediction module may also include median VI time series across all fields of a given crop type during a single year (the median time series profile, or "median_ts"). In some embodiments, the VI of the median time series profile is NDVI. The median time series profile is preferably assessed when the majority of cover crops are grown in the region, for example between Dec. 1 and Aug. 1 (when a majority of cover crops are grown across the eastern US).

The cover crop prediction model parameters as described above are shown below in Table 4. Time window parameters ("gs_window", "peak_window", "winter window", and "median_window") are selected according to a priori knowledge of approximate summer and winter crop calendars for the crop type and geographic region of interest. The "threshold_nveg" parameter was defined according to previous phenological research indicating relative NDVI associated with emerging vegetation.

The cover crop prediction model features as described above are shown below in Table 5. A selection of these features are calculated for each field-year using a suite of time series analysis and heuristic methods, as well as the model parameters described above. In an exemplary embodiment, the raw zonal summary observations are first interpolated at daily time resolution using a Savitzky-Golay filter. Signal processing techniques are used to detect peaks in the interpolated time series with sufficient NDVI amplitude. If two or more peaks are detected during "peak_window", the first detected peak is identified as the cover crop peak, while the final peak is identified as the summer crop peak. Phenology metrics ("spr_15_max", "spr_50_max, "sos_cc" and "eos_cc") are then detected based on the timing of percentage thresholds of the normalized amplitude of each of these peaks. It will be appreciated that alternative selections of features may be used, as set forth in further examples below.

The cover crop prediction model classifications as described above are shown below in Table 6. Field-level classifications are made according to a manual decision tree.

TABLE 4

| Cover crop prediction model parameters | |
|---|---|
| Parameter | Description |
| gs_window | window used to calculate maximum gap between cloud-free observations during the growing season (for example, between March 1 and September 1 of each year) |
| peak_window | window used to count seasonal peaks of NDVI (for example, between September 1 of previous and current years; winter wheat is July 15) |
| winter_window | window used to compute wintertime NDVI composite (for example, between November 1 and May 1 for northern hemisphere summer crops; winter wheat is September 1 and March 1) |

TABLE 4-continued

| Cover crop prediction model parameters | |
|---|---|
| Parameter | Description |
| median_window | window used to calculate median VI time series across all geo-ids for each crop type within a county (for example, November 1 and June 1) |
| threshold_nveg | threshold of wintertime NDVI required to detect cover crop (NDVI > 0.3) |
| threshold_max_gap | threshold of maximum gap required to detect cover crop (n > 75 days) |
| threshold_snow_free_obs | threshold of number of wintertime cloud-free observations required to generate wintertime composite (n > 2) |
| threshold_spr_len | threshold of number of days between timing of 15% and 50% of normalized amplitude in spring (n > 30) This is used in cases when NDVI increases due to cover crop emergence but does not decrease due to significant gap in cloud-free images. |
| threshold_spr_halfmax | threshold of number of spring greenups (VI peaks) required to detect cover crops (n > 1) |
| threshold_distance | threshold of euclidean distance (in greenness) between VI time series of geo-id and median VI time series across all fields of same crop type during a given year (NDVI = 2) |
| min_NDVI_threshold | minimum NDVI which is considered vegetation (NDVI = 0.05) Observations with NDVI below min_NDVI_threshold are excluded from the analysis. |
| threshold_proportion_missing | proportion of bad/total observations from a given field zonal summary time series required to run the algorithm (n > 0.001) |
| amp_threshold | amplitude of NDVI peak required to detect a cover crop (NDVI = 0.1) |

TABLE 5

| Cover crop prediction model features | |
|---|---|
| Feature | Description |
| max_gap | maximum gap between cloud-free observations between March 1 and September 1 |
| spr_15_max | day of year when NDVI reaches 15% of the normalized amplitude of the last detected peak during peak_window |
| spr_50_max | day of year when NDVI reaches 50% of the normalized amplitude of the last detected peak during peak_window |
| spr_length | number of days between spr_15_max and spr_50_max |
| spr_half-max_count | number of greenups during peak_window |
| sos_cc | day of year when NDVI reaches 50% of the normalized amplitude of the increasing side of the first detected peak during peak_window (assumed to be associated with spring emergence of cover crop) |
| eos_cc | day of year when NDVI reaches 50% of the normalized amplitude of the decreasing side of the first detected peak during peak_window (assumed to be associated with termination of cover crop) |
| pk_vi_cc | magnitude of NDVI of first detected peak during peak_window |
| distance | euclidean distance between VI time series and median VI time series across all geo-ids of the same crop type during median_window |
| winter_vi_90 | 90th percentile of smoothed NDVI during winter_window |
| winter_vi_10 | 10th percentile of smoothed NDVI during winter_window |
| winter_vi_obs | number of cloud-free observations during winter_window |

TABLE 6

Cover crop prediction model classifications

| Classification | Description |
|---|---|
| Not observed (cover_crop_class = 0) | a. Fewer than 3 cloud-free observations during winter_window<br>b. Maximum gap larger than 75 days between cloud-free observations during peak_window |
| No cover crop (cover_crop_class = 1) | a. Fewer than 2 greenups and winter greenness less than a threshold value (for example, winter_vi_90 < 0.3)<br>b. Fewer than 2 greenups, winter greenness greater than a threshold value (for example, winter_vi_90 ≥ 0.3), and spring length less than a threshold number of days (for example, spr_length < 30 days) (likely an early greening summer commodity crop)<br>c. Fewer than 2 greenups and winter wheat CDL |
| Wintergreen cover crop (cover_crop_class = 3) | a. Fewer than 2 greenups, winter greenness greater than a threshold value (for example, winter_vi_90 ≥ 0.3), spring length greater than a threshold number of days (for example, spr_length > 30 days), and not winter wheat CDL<br>Note: winter wheat fields with no cover crops typically had long spring lengths<br>b. At least 2 greenups and winter greenness greater than a threshold value (for example, winter_vi_10 or winter_vi_90 > 0.3)<br>c. Distance ≥ 2 |
| Winterkill cover crop (cover_crop_class = 4) | a. At least 2 greenups and winter greenness less than a threshold value (for example, winter_vi_90 < 0.3)<br>b. Distance ≥ 2 |
| Perennial (cover_crop_class = 5) | a. CDL = 36 (alfalfa), 37 (hay) or 62 (grass/pasture) |
| High uncertainty (cover_crop_class = 6) | a. Any field with Wintergreen/Winterkill/Perennial characteristics and distance < 2 |

Figure 4:
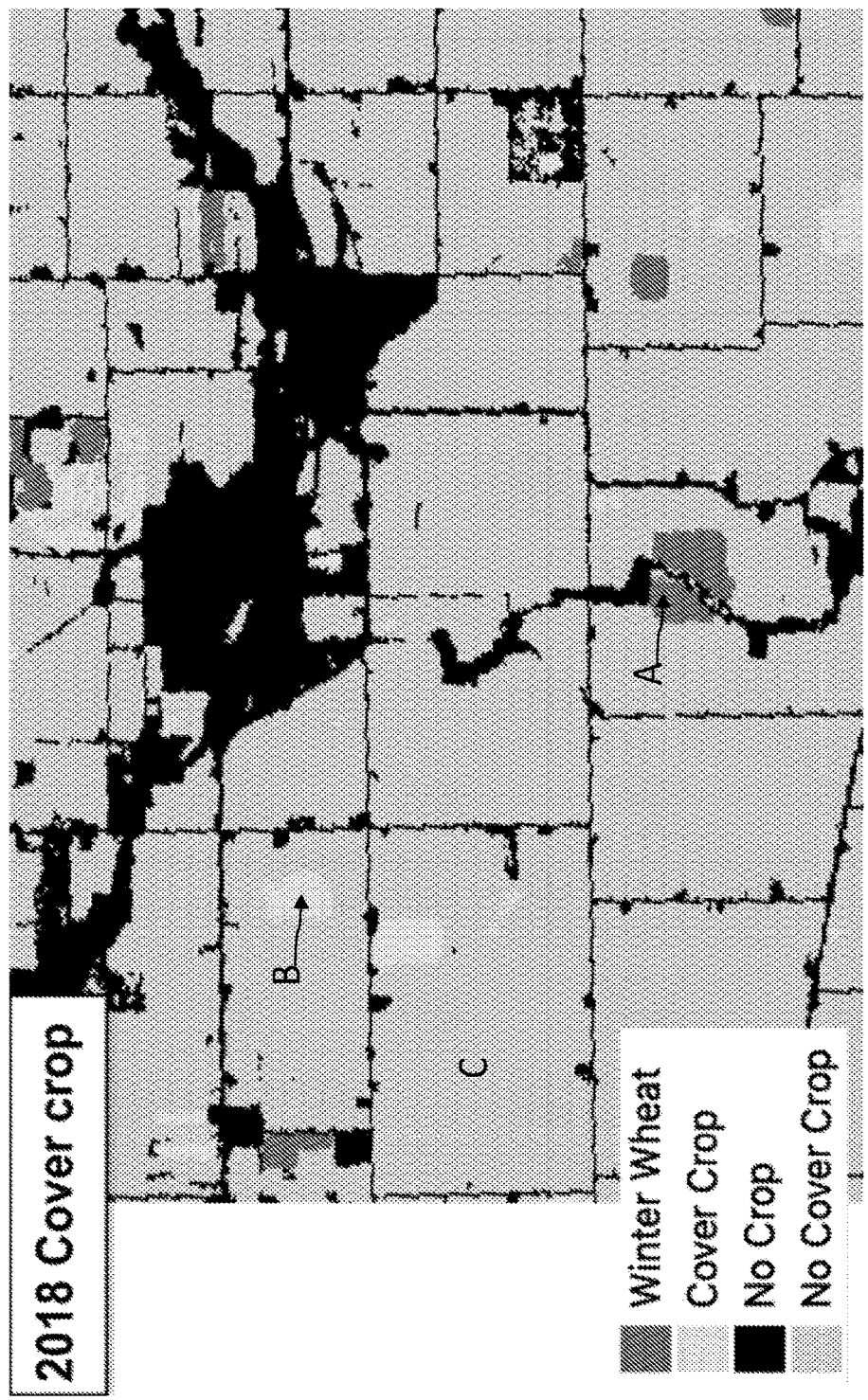
FIG. 4 shows exemplary results of applying a cover crop prediction module according to embodiments of the present disclosure to a region in Iowa.

FIG. 4 shows exemplary results of applying the cover crop prediction module to a region in Iowa. Regions growing winter wheat are shown in red (for example: A). Regions predicted to grow a cover crop (cover_cover_class=3 or 4) are shown in yellow (for example: B). Regions predicted not to have a cover crop are shown in grey (for example: C) and regions not predicted to have any crop are shown in black (for example: D).

In one example, the crop prediction module was applied to a test set of 137 fields having a cover crop label and correctly classified 123 (89.8%) as having cover crops.

Figure 5:
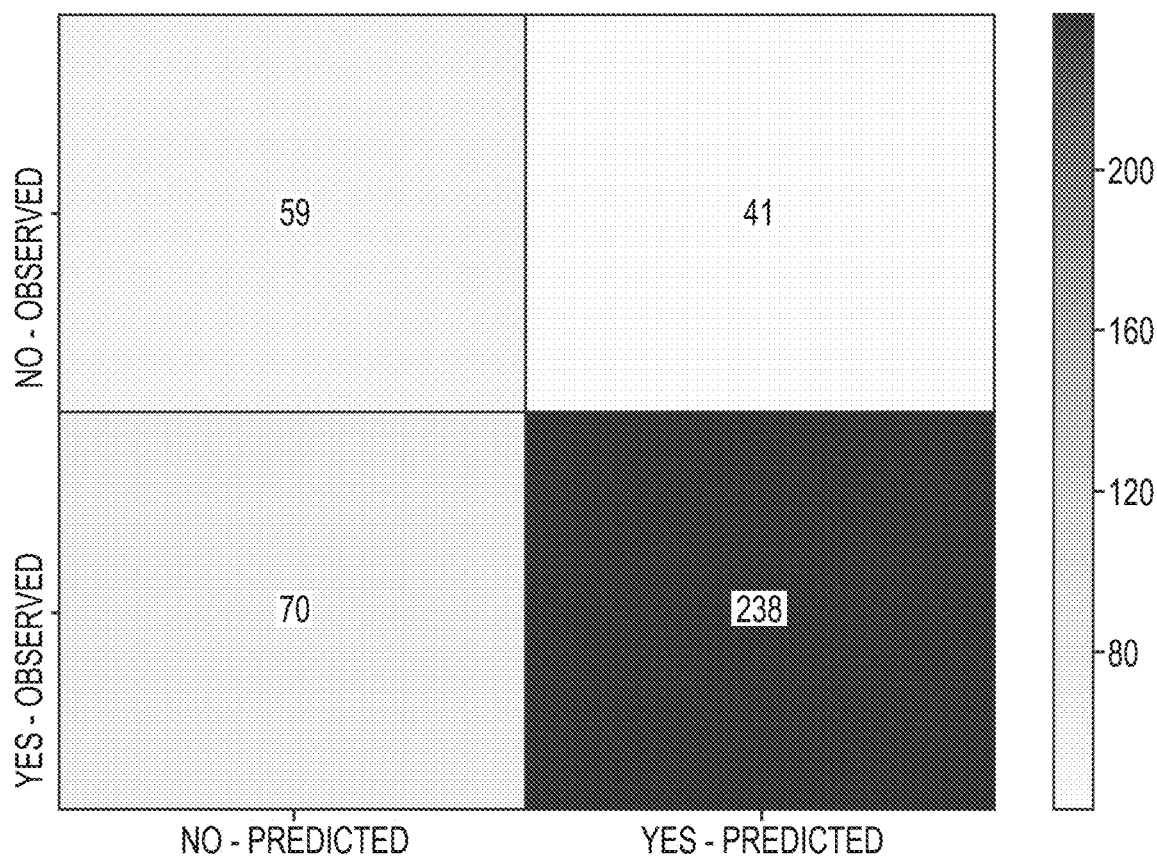
FIG. 5 is a confusion matrix resulting from exemplary data according to embodiments of the present disclosure.
Figure 6:
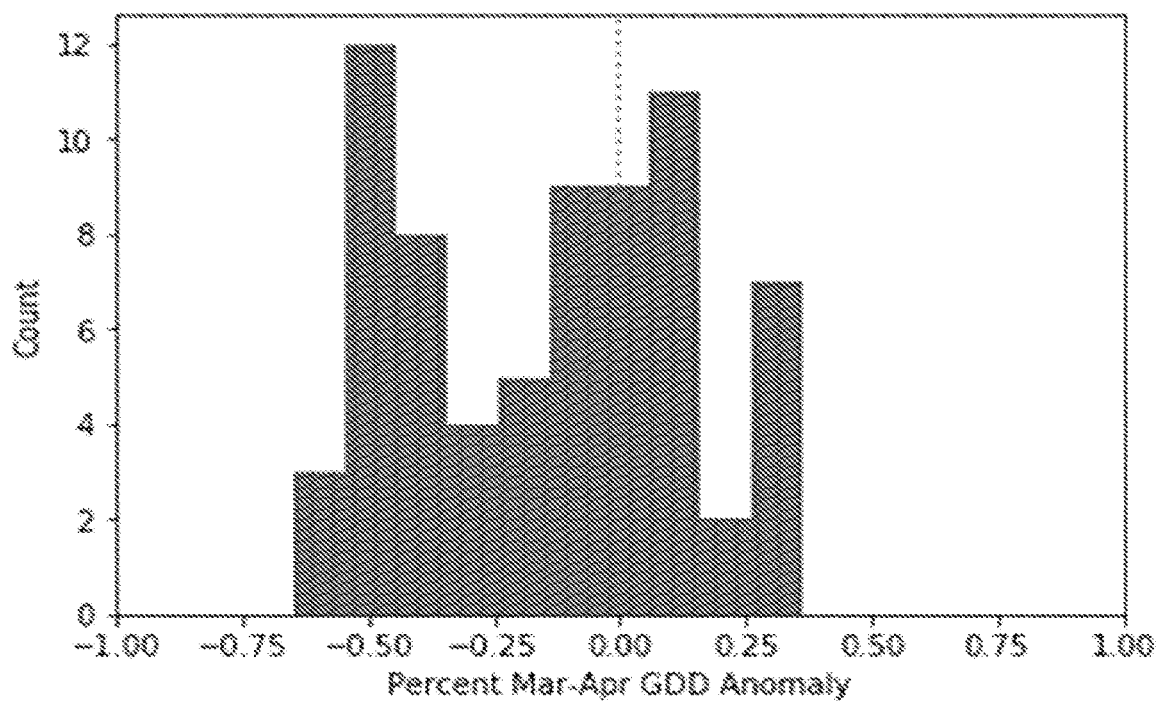
FIG. 6 is a histogram of the number of fields and the percent below (negative) or higher (positive) the expected GDD for March-April according to embodiments of the present disclosure.

In another example, the crop prediction module was applied to a test set of annual crop planting and harvesting information from 2014-2019. The crop prediction module correctly identified presence/absence of cover crops in 297 (73%) of the 408 total field/years, see confusion matrix shown in FIG. 5. Of the 70 field-years with observed cover crop planting and predicted cover crop absence, 26 experienced greater than 20% negative growing degree day (GDD) anomalies relative to the 2014-2019 average. FIG. 6 shows a histogram of the number of fields and the percent below (negative) or higher (positive) the expected GDD for March-April. Removal of these field years increases the overall accuracy to 79%. This phenomenon illustrates the importance of using training data where cover crop was known to have reached mature growth stages.

Figure 7:
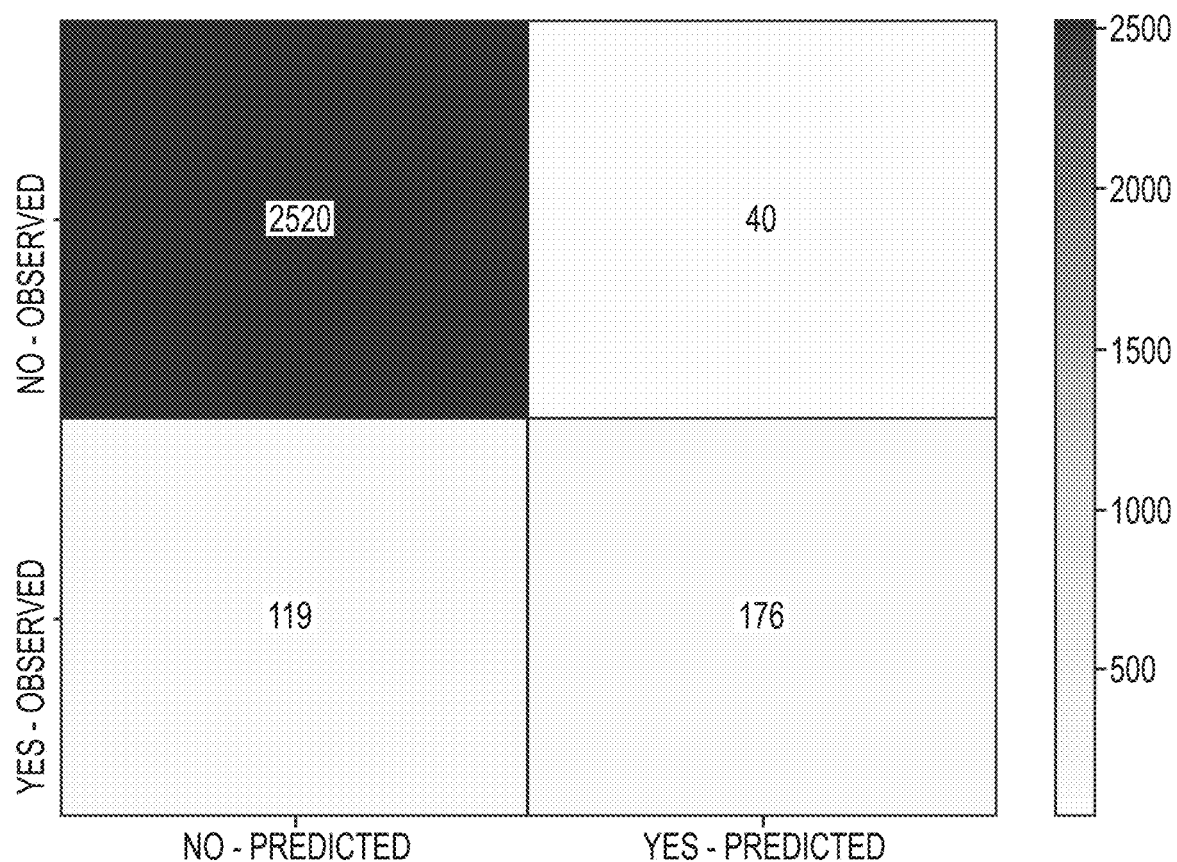
FIG. 7 is a confusion matrix resulting from exemplary data according to embodiments of the present disclosure.

In another example, the cover crop prediction module was applied to an input data set comprising 2,855 fields. The cover crop prediction module correctly identified presence/absence of cover crops in 2,696 (94.4%) of the fields, see confusion matrix shown in FIG. 7.

Figure 19:
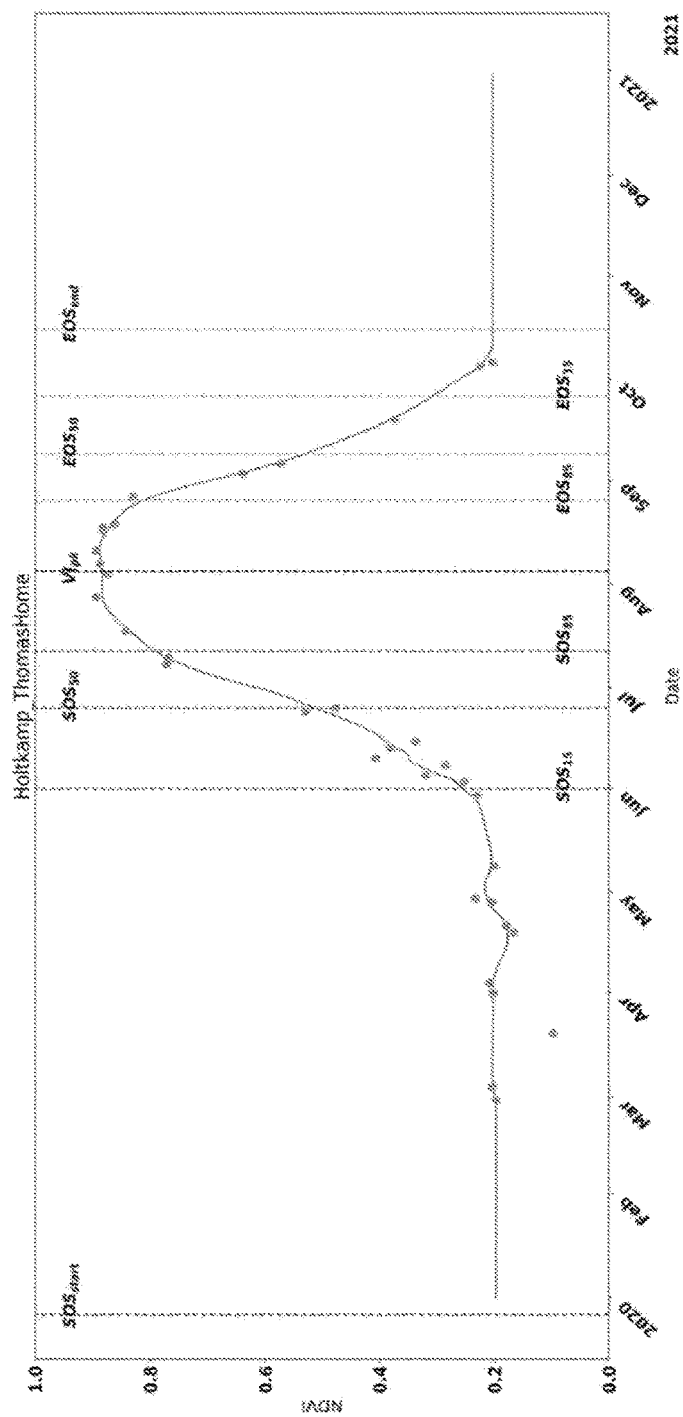
FIG. 19 shows an exemplary NDVI curve according to embodiments of the present disclosure.

FIG. 19 shows an exemplary NDVI curve, which is used to illustrate an exemplary model. During vegetation growth, the NDVI value will gradually increases, reaches a certain highest value (which is called peak), and then decreases (which resembles a bell shape such as shown in FIG. 19). Depending on the crop management practice, each field can grow one or multiple crops per year. For the model, the features are created based on the peak development. For each field, there will be features for 3 peaks. If a field has fewer than 3 peaks, all the features will be equal to 0. If a field has more than 3 peaks, only the first 3 peaks' features will be chosen.

As shown in FIG. 19, for each peak, the following are detected: (1) the timing of inflection the inflection point between the current and previous peak (sos_start), (2) the timing of 15%, 50% and 85% of normalized amplitude during the increasing (sos_15, sos_50 and sos_85) and decreasing (eos_15, eos_50 and eos_85) portions of the peak and (3) the timing of inflection point between the current and subsequent peak (eos_end). Using these dates, the following features are computed, which are used to train a decision tree classifier: the NDVI value within the time period as noted in the table; boundary date features; and rate of NDVI change between first and third quantile for start of season/end of season. Boundary date features are calculated in days. The boundary date is set at August 1st of the previous year to the date where the maximum NDVI happens in the current year of the observation.

TABLE 7

Decision Tree Features

| Classification | Description |
|---|---|
| sos_quant_1 | 90th percentile NDVI between sos_start and sos_15 |
| sos_quant_2 | 90th percentile NDVI between sos_15 and sos_50 |
| sos_quant_3 | 90th percentile NDVI between sos_50 and sos_85 |
| eos_quant_1 | 90th percentile NDVI between eos_85 and eos_50 |
| eos_quant_2 | 90th percentile NDVI between eos_50 and eos_15 |
| eos_quant_3 | 90th percentile NDVI between eos_15 and eos_end |
| sos_halfmax | difference in days between boundary date and sos_50 |
| eos_halfmax | difference in days between eos_50 and boundary_date |
| sos_rate_change | (sos_quant_3-sos_quant_1)/# of days between sos_15_date and sos_85_date |
| eos_rate_change | (eos_quant_3-eos_quant_1)/# of days between eos_15_date and eos_85_date |

In an exemplary embodiment, three type of models were evaluated: Random Forest Classifier, k-nearest neighbor algorithm, and XGBoost Classifier. Random Forest Classifier offers the most consistent performance across all the zones. However, XGBoost Classifier allows a more flexible approach regarding customized loss function.

Since each zone has different crop management practices and different class ratio among training data, the model is trained within each zone. Instead of having a set of fixed parameters, each model was trained using GridSearchCV method with customized scoring (scores is based on: accuracy, recall_weighted, precision_weighted). This method eliminates unnecessary manual changes in parameters when switching between zones. Besides keeping some parameters as default, the below parameters list is evaluated by GridSearchCV to find the most suitable parameter for each zone is: {'n_estimators': [100, 150,200], 'max_depth':[13, 15, 17], 'min_samples_split': [3, 5], 'min_impurity_decrease': [0.01, 0.001], 'min_samples_leaf:[1, 3], 'max_features': ['auto','log 2', None], 'class_weight': ['balanced_subsample'], 'bootstrap': [False]}

The model classify 3 classes: None/Weeds (label as 0), Cover Crop (label as 1), Other Crop (label as 2).

Figure 20:
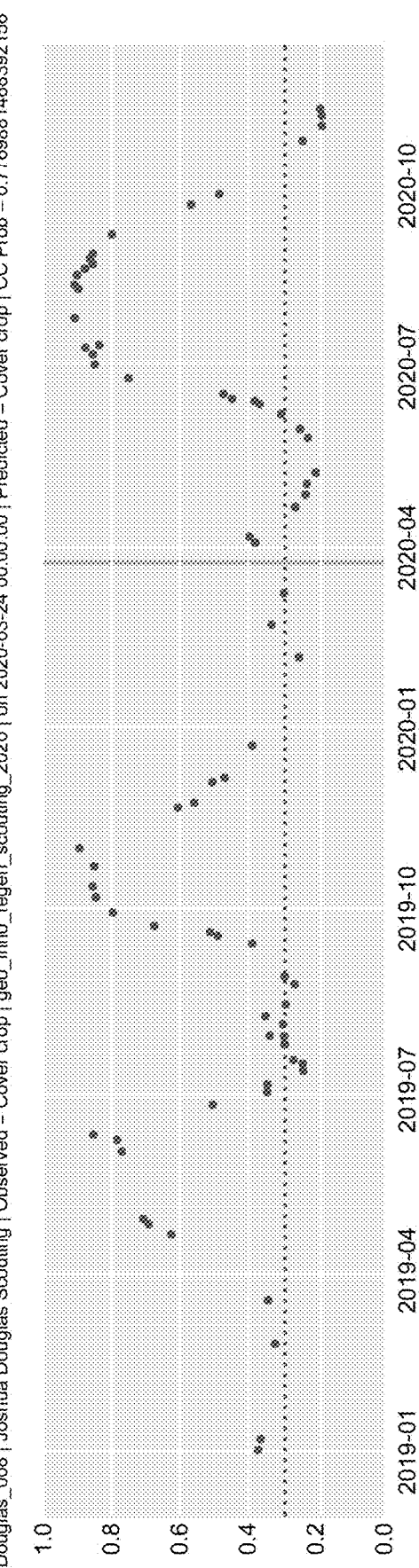
FIGS. 20-21 show example data illustrating true positives for a cover crop according to embodiments of the present disclosure.
Figure 21:
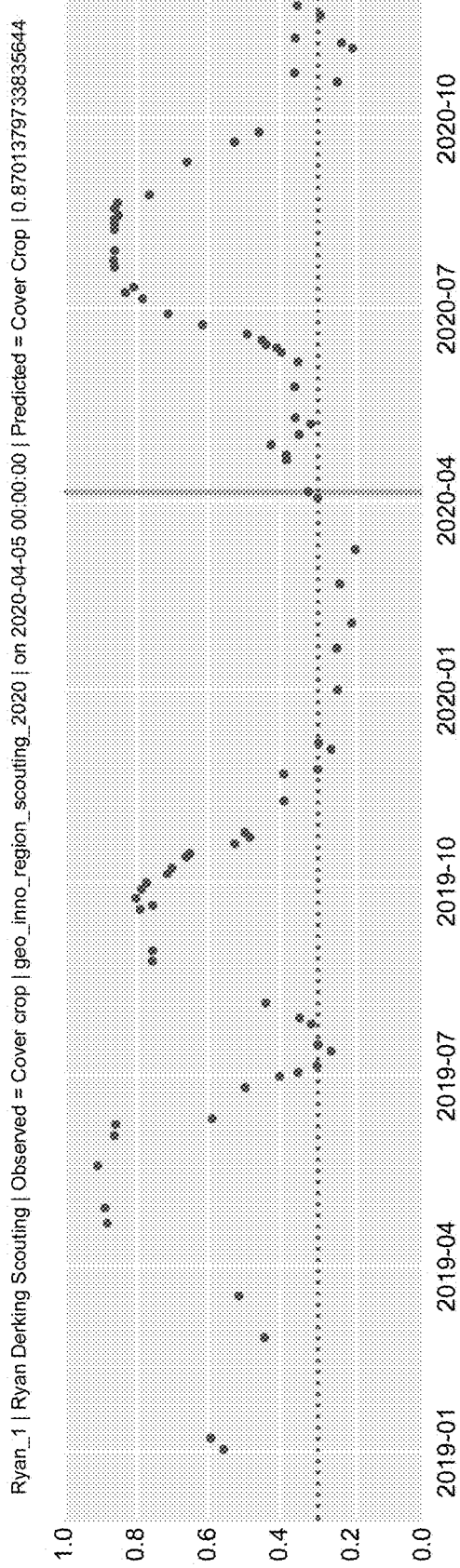
Figure 22:
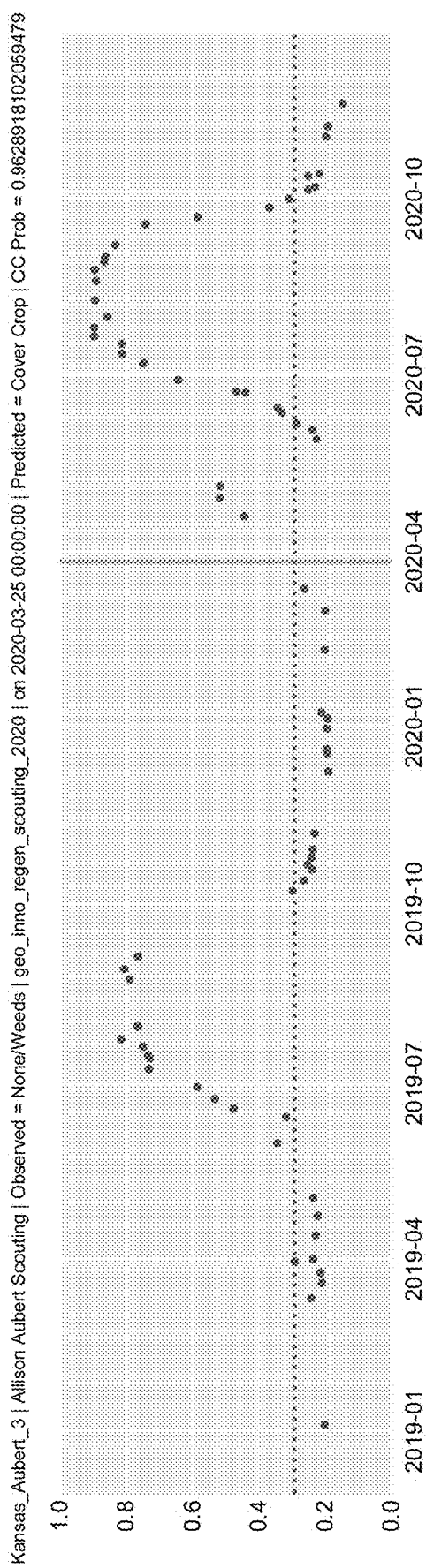
FIGS. 22-23 show example data illustrating false positives for cover crops according to embodiments of the present disclosure.
Figure 23:
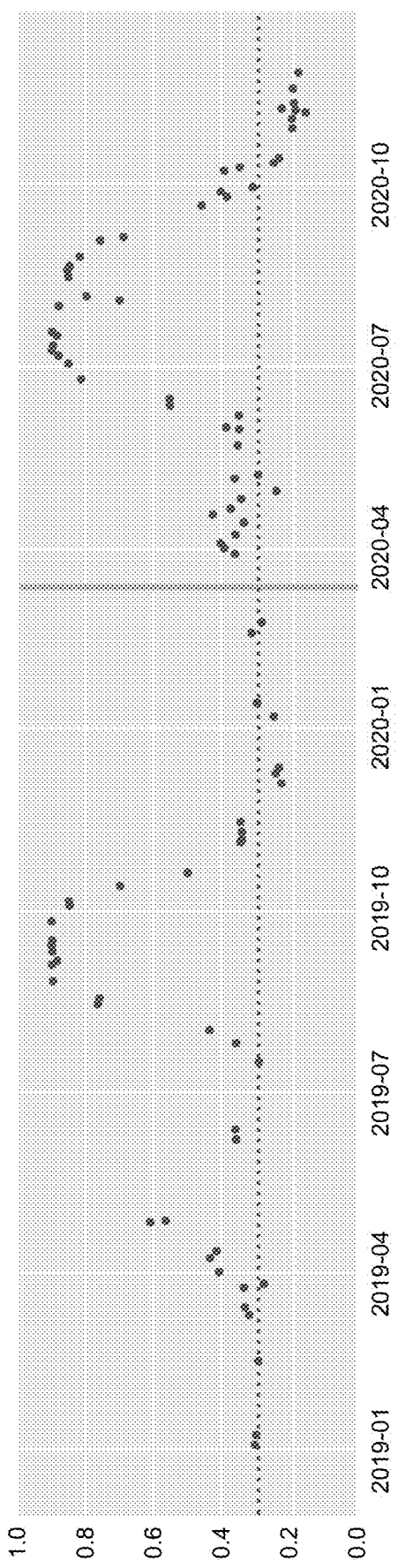

Referring to FIGS. 20-21, example data are provided illustrating true positives for a cover crop. FIGS. 22-23 illustrate false positives for cover crops. The blue dot represents median NDVI value (from HLS source). The red line represents when the observation was made. CC Prob is the cover crop probability that the model predicts.

Figure 24:
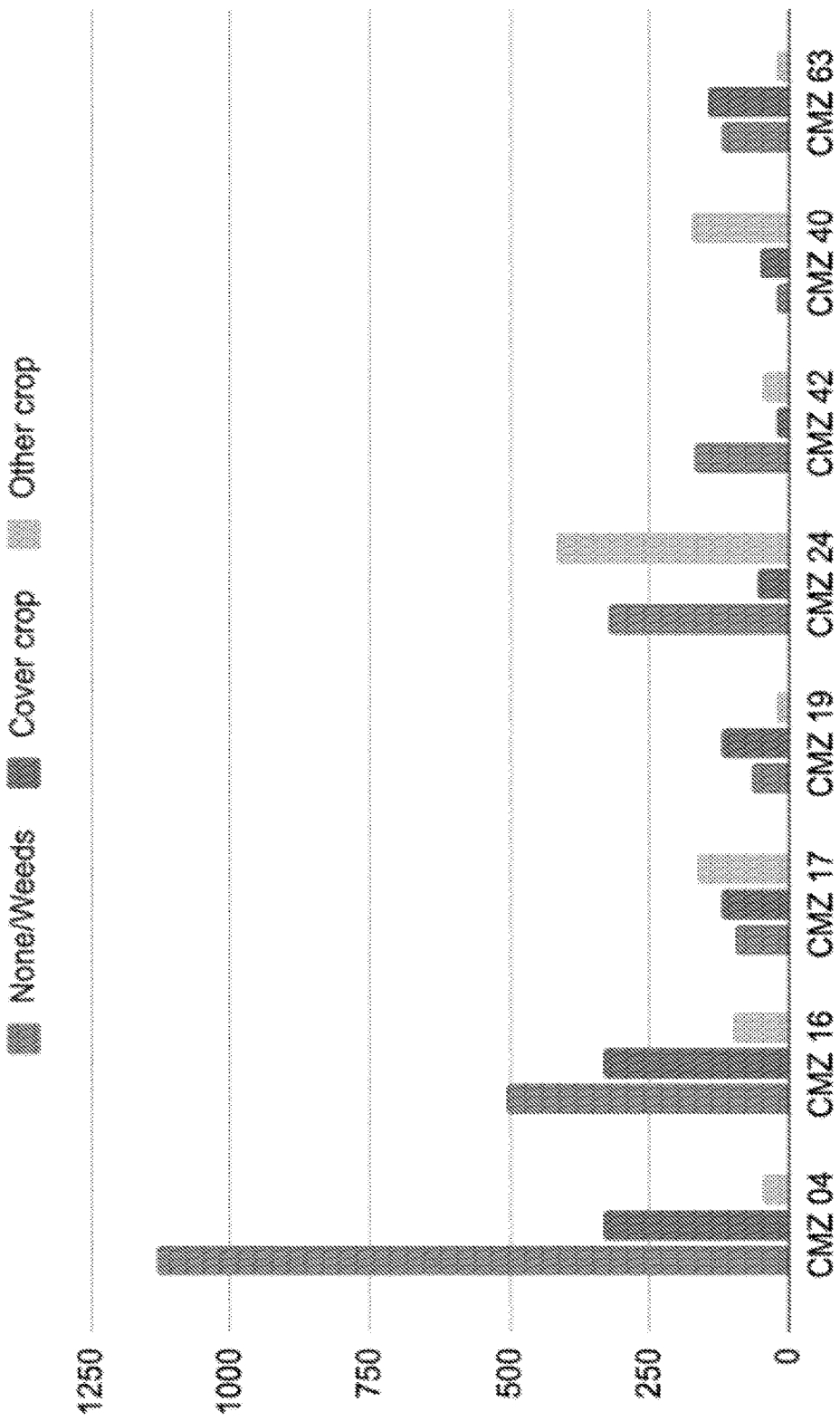
FIG. 24 shows the crop classification for seven exemplary zones according to embodiments of the present disclosure.

This example uses cover crop field survey data, including 2020 scouting. Training data were available in each of seven evaluated zones. FIG. 24 shows the crop classification for the seven zones.

The model was evaluated using 2 different methods. The first method evaluated the model using the test/validation data on default scoring. The results of this method are provided below in Table 8.

TABLE 8

| Model Accuracy | | | | | | | | |
|---|---|---|---|---|---|---|---|---|
| | CMZ 04 | CMZ 16 | CMZ 17 | CMZ 19 | CMZ 24 | CMZ 40 | CMZ 42 | CMZ 63 |
| Accuracy | 96.7 | 91.5 | 88.2 | 78.5 | 93.4 | 82.7 | 88.9 | 74.7 |
| Precision | 74.4 | 86 | 90 | 63.3 | 85.5 | 75.1 | 72 | 68.3 |
| Recall | 72.6 | 83.8 | 85.9 | 62 | 87.2 | 76.8 | 74.1 | 69.6 |
| f_1 | 72 | 84.3 | 86.4 | 62.5 | 86.3 | 75.9 | 72.4 | 68.8 |
| Precision for CC | 81 | 78 | 72 | 80 | 67 | 77 | 43 | 79 |
| Recall for CC | 97 | 93 | 96 | 87 | 73 | 77 | 60 | 72 |
| f-1 for CC | 88 | 85 | 83 | 84 | 70 | 77 | 50 | 75 |

The second method is to compare model performance with the USDA Census data, which provides the cover crop rate for each county in 2017. Within each zone, the model was first run to predict the cover crop probability. Next, the county adoption rate was calculated as below.

$$\frac{\text{Sum of areas of sub county with predicted cover crop probability higher than } X}{\text{Total area of county}}$$

Figure 25:
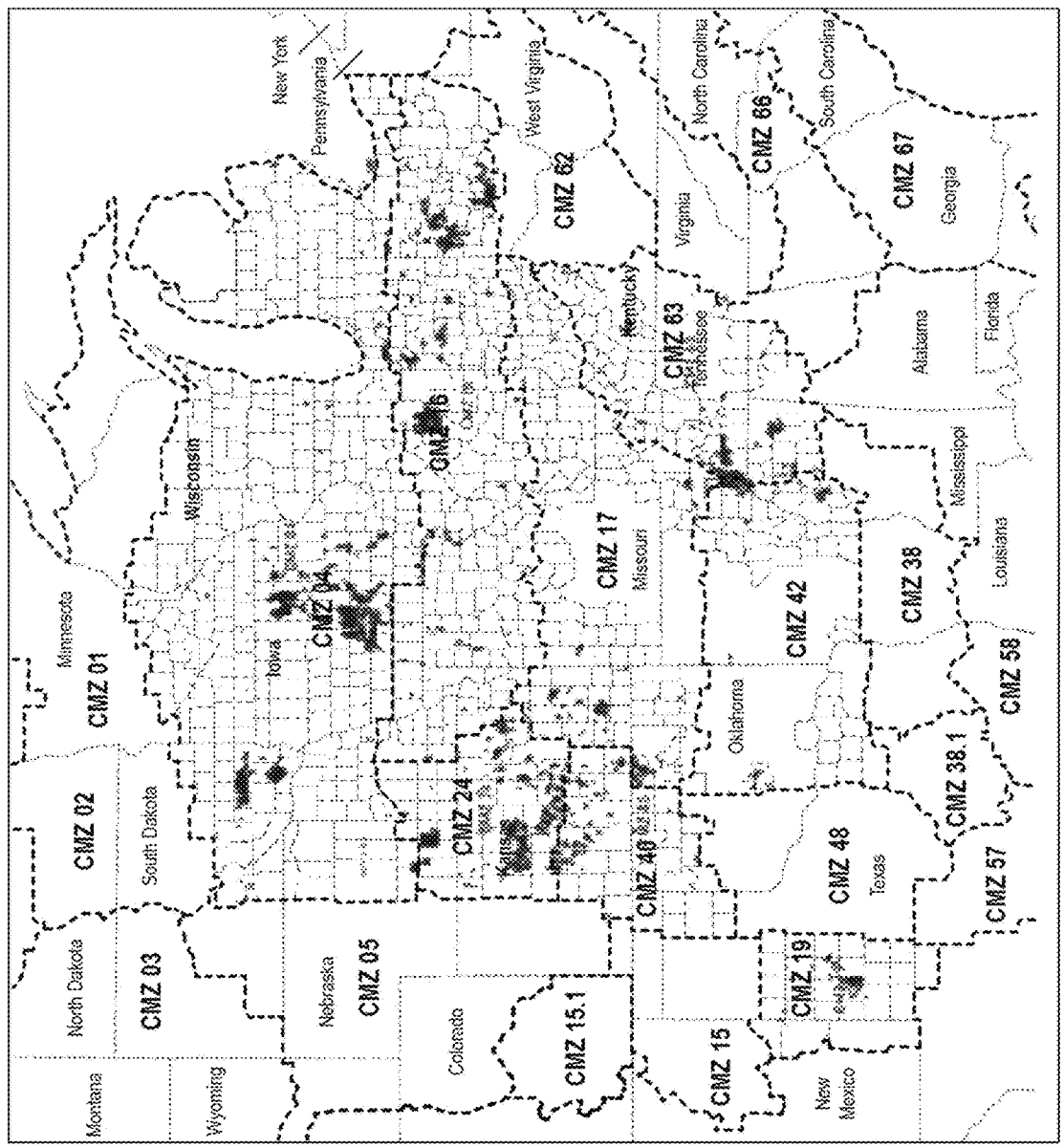
FIG. 25 shows the locations of training data for the evaluated zone according to embodiments of the present disclosure.

FIG. 25 shows locations of the training data for the evaluated zone. The black dot represents the training data. The dot black line represents the zone boundaries. The light line represents the state boundaries.

Figure 26:
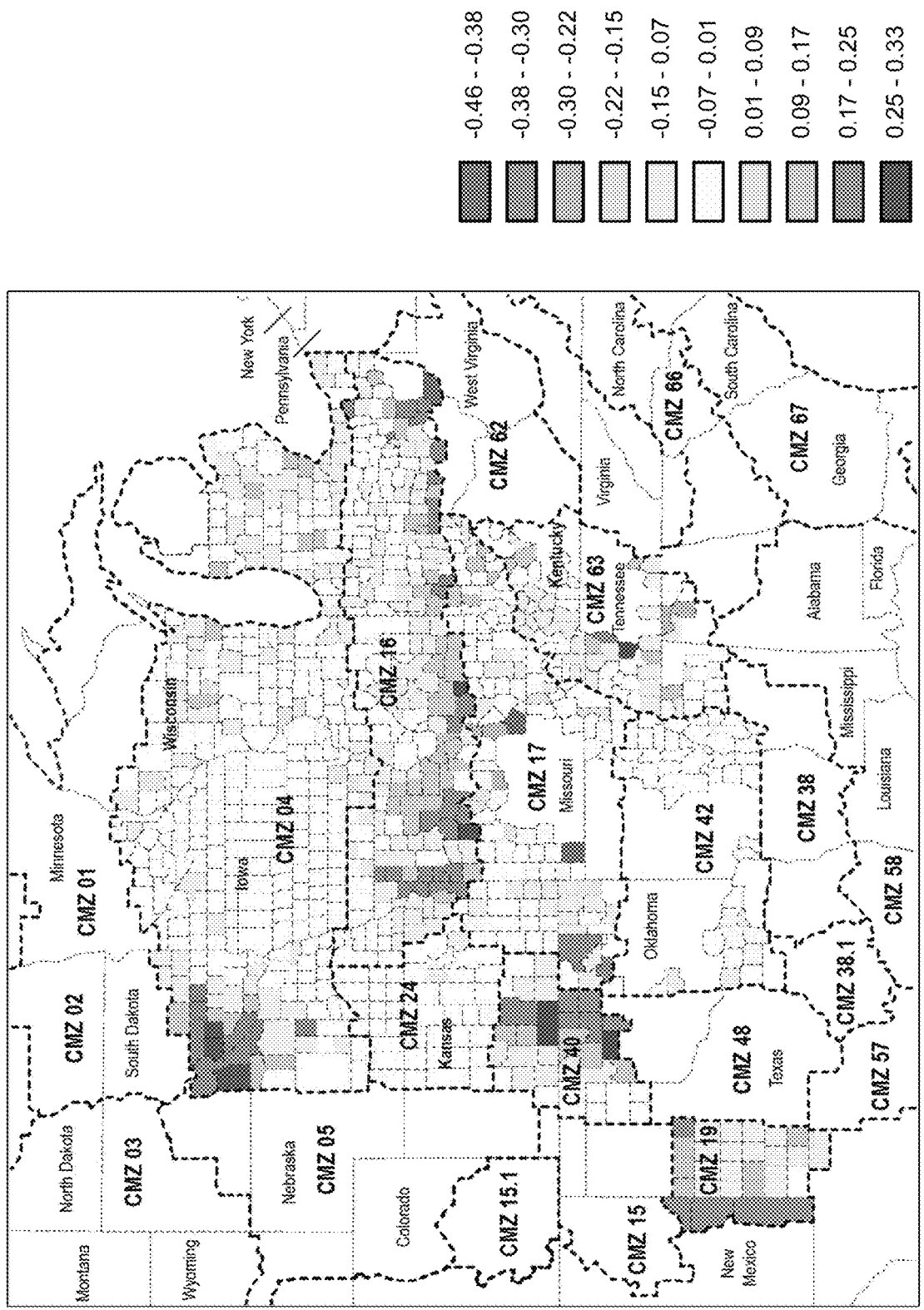
FIG. 26 shows the difference between the predicted cover crop probability at threshold 0.7 and the USDA rate according to embodiments of the present disclosure.

FIG. 26 shows the difference between the predicted cover crop probability at threshold 0.7 and the USDA rate. The negative value (red-like color) indicates where the model under estimates and the positive value (gray-like color) indicates where the model over estimates the cover crop probability.

Regenerative Practice Module

Outcomes of a regenerative practice prediction (e.g. module can be aggregated to generate regenerative practice reports. The scalable methods of the present disclosure can be scaled to generate predictions for cover crop and no-till acres for geographic regions, for example for every state or province in a country or one or more agricultural districts in a county. A geographic region may be any area having a defined boundary, including an administratively defined boundary such as a city, county, state, or production region (for example, USDA production region), a boundary estimated from analysis of remote sensing imagery (for example, a field boundary), or a user defined boundary (for example, field or farm boundary including as defined in shape file). For example, the methods of the present invention include, in some embodiments, additional steps of estimating the total percentage of farming acres utilizing regenerative practices (e.g. tillage practices, and cover crops). For example, methods of the present disclosure were applied to data representing USDA Production Regions, results are displayed in Table 9.

TABLE 9

| Estimated percentage of acreage planted in cover crops and or adopting no-till practices by USDA Production Region in 2020. | | | | | | | |
|---|---|---|---|---|---|---|---|
| Production Region | Area planted, acres* | CC planted (%) | No CC planted (%) | Planted CC, and didn't till (%) | Planted CC, but till (%) | Didn't plant CC, but didn't till (%)1 | Didn't apply any regen Didn't apply practice (%) |
| Appalachian | 15,916,000 | 11.54 | 88.46 | 8.29 | 3.25 | 60.63 | 27.83 |
| Corn Belt | 77,431,000 | 4.62 | 95.38 | 2.93 | 1.69 | 29.67 | 65.72 |
| Delta States | 13,884,000 | 6.76 | 93.24 | 2.99 | 3.77 | 22.62 | 70.62 |
| Lake States | 37,077,000 | 5.7 | 94.3 | 2.24 | 3.45 | 13.11 | 81.19 |
| Mountain | 27,405,000 | 8.03 | 91.97 | 2.21 | 5.82 | 31.09 | 60.88 |
| Northeast | 9,780,000 | 15.25 | 84.75 | 10.7 | 4.55 | 58.72 | 26.03 |
| Northern Plains | 76,625,000 | 3.99 | 96.01 | 2.14 | 1.85 | 38.21 | 57.8 |
| Pacific | 15,080,000 | 19.69 | 90.31 | 2.26 | 7.43 | 23.37 | 66.93 |
| Southeast | 8,528,000 | 11.33 | 88.67 | 6.55 | 4.79 | 40.73 | 47.93 |
| Southern Plains | 27,942,000 | 6.54 | 93.46 | 2.18 | 4.36 | 27.14 | 66.31 |

CC = cover crop; area planted includes: corn, soy, cotton, small grains, other grains and other crops.

Embodiments of disclosed methods may also include tracking changes in utilization of regenerative practices over time. In one example, methods of the present disclosure were applied to historical and present data for farmland in the United States. These results predicted that cover crop acreage peaked in 2017 in the United States at 19.8 M acres and steeply dropped in 2018 to 14 M acres. A similar peak and steep decline was reported for all agricultural districts producing at least 10 M bushels of corn and soybeans with estimates of 6.7 M acres (5.3%) of cover crops in 2017 and 3.3 M acres (2.6%) in 2018, a 50% decrease in acreage year-over-year. In the same region, it was estimated that annual cover crop adoption rates for corn, soybeans and small grains grew from 2.6% to 2.9% from 2018 and 2019, a 400 k acreage increase.

Figure 13:
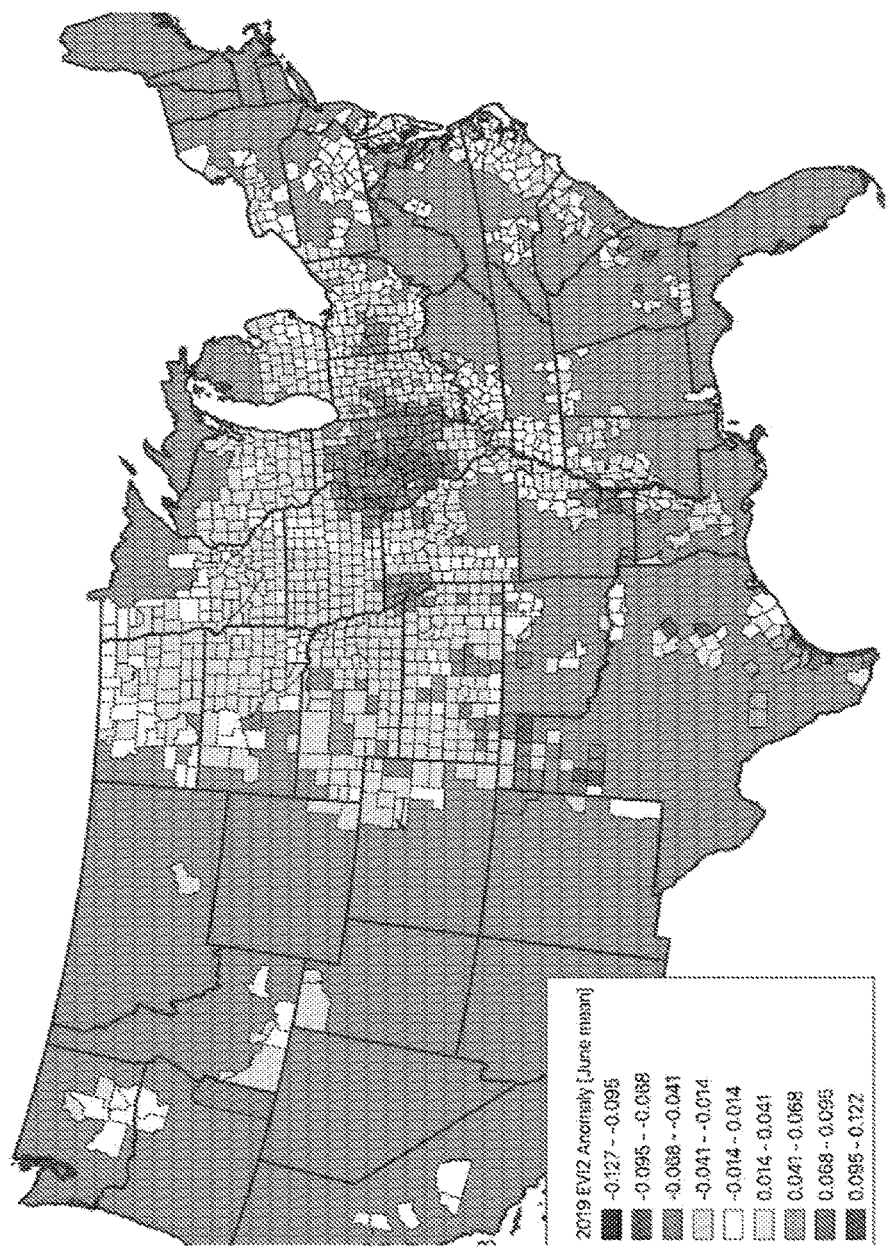
FIG. 13 shows an example of regenerative county level summaries of regenerative practices in a map of the United States according to embodiments of the present disclosure.

In some embodiments, locations predicted to utilizing one or more regenerative practice (e.g. cover crops or no- or low-tillage practices) are displayed on a map and summarized by geographic region. FIG. 13 shows an example of regenerative county level summaries of regenerative practices in a map of the United States.

Figure 14A:
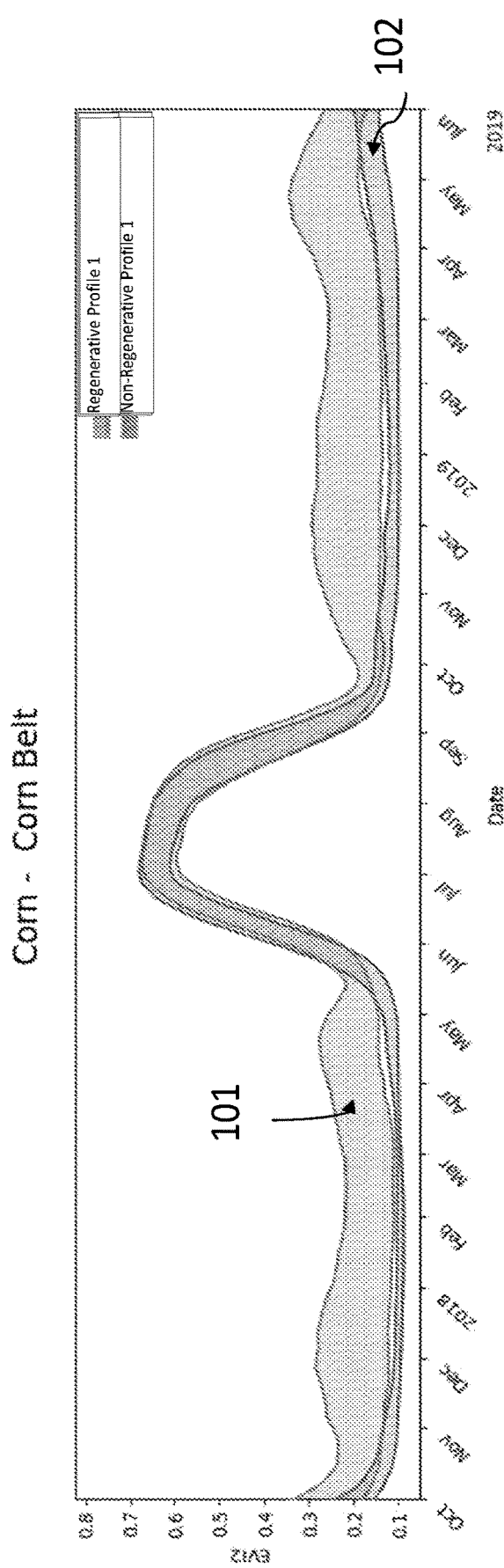
FIG. 14A and FIG. 14B show time series of the seasonal progression of crop health for Regenerative Profile 1 fields versus Non-Regenerative Profile 1 counterparts for corn and soybeans according to embodiments of the present disclosure.
Figure 14B:
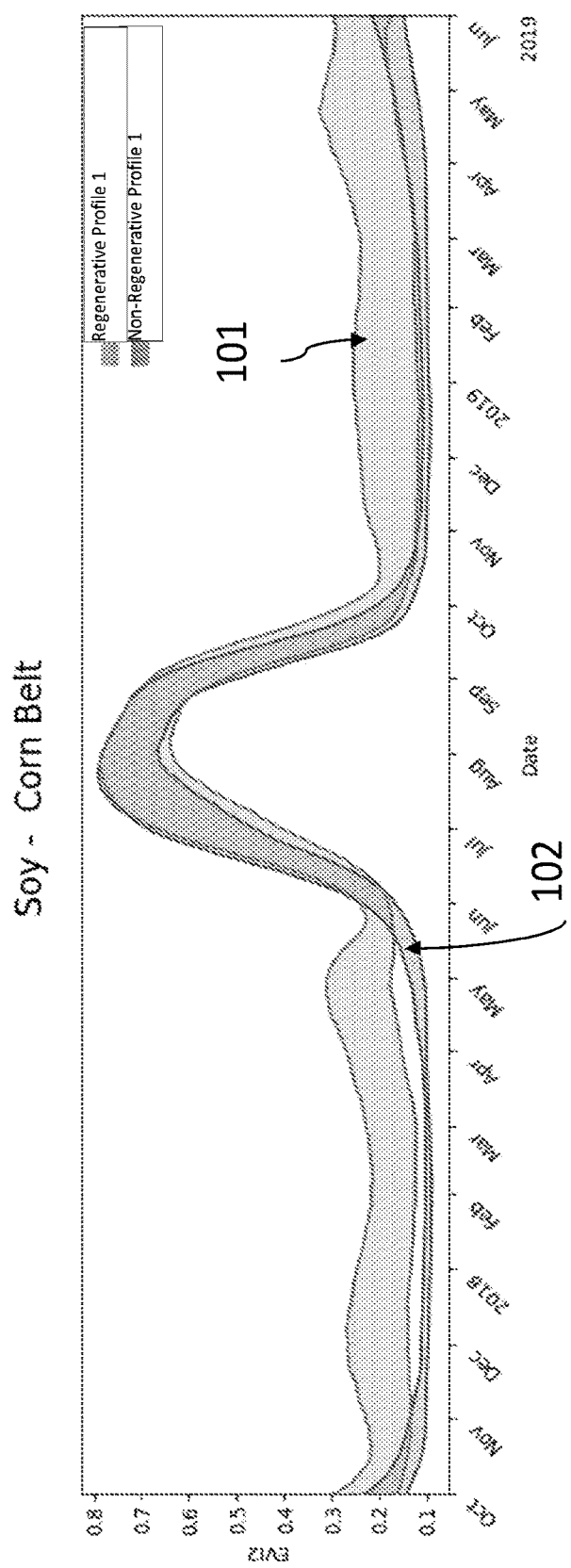

Methods of the present disclosure may also be used to assess the relative health of regenerative and conventionally grown crops. For example, methods of the present disclosure were used to identify fields for employing cover crop and no-till practices for 2 or more years between 2016-2019 and at planted with least 3 crop types between 2013-2018 ("Regenerative Profile 1"), and Non-Regenerative Profile 1 fields defined as 0 years cover crops, 0 years no-till, and less than 3 crop types during the same period. FIG. 14A and FIG. 14B show time series of the seasonal progression of crop health for Regenerative Profile 1 fields (101) versus Non-Regenerative Profile 1 (102) counterparts for corn (FIG. 14A) and soybeans (FIG. 14B) in the Corn Belt production region. FIG. 14A shows EVI2 values for 2019 in 722 Regenerative Profile 1 corn fields and 722 Non-Regenerative corn fields, and FIG. 14B shows EVI2 values for 2018-2019 in 863 Regenerative Profile 1 soy fields and 863 Non-Regenerative soy fields in 2018-2019. These figures reveal that adopting regenerative practices will not lead to a lag in crop development for either corn and soybeans, and similar EVI2 peak values are reached. There appears to be a slight seasonal shift in the crop health curve for soybeans, with slightly delayed emergence, but this is accompanied by a slightly greener period in the fall. The higher EVI2 values outside of the growing season for the regenerative group capture the signal of cover crops. As the timing of cover crop emergence varies from field to field, there are not strongly defined peaks for cover crops in this figure, but more a consistently high EVI2 value signifying the various timing of cover crop emergence across the corn belt. The time-series shown in FIG. 14A and FIG. 14B capture the center 50% of the data.

Figure 15:
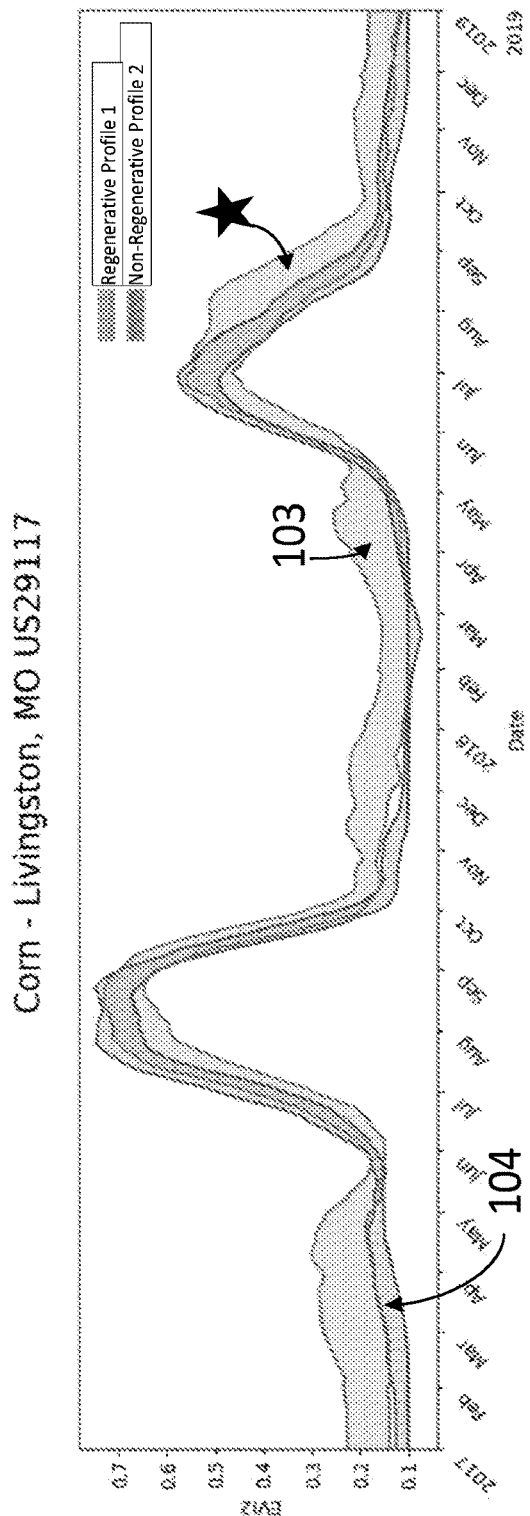
FIG. 15 shows time series of the seasonal progression of crop health of regenerative and conventionally grown crops according to embodiments of the present disclosure.

An additional example of how methods of the present disclosure may be used to assess the relative health of regenerative and conventionally grown crops is illustrated in FIG. 15. In this example methods of the present disclosure were used to identify fields employing cover crops for 2 or more years ("Regenerative Profile 2"), and Non-Regenerative Profile 2 fields defined as 0 years cover crops. In Livingston County, Missouri, which experienced a drought in 2018, Regenerative Profile 2 fields (103) tended to be less impacted by the drought later in the growing season (indicated by star shape in FIG. 15) when compared to Non-Regenerative Profile 2 fields. Both Regenerative Profile 2 fields (103) and Non-Regenerative Profile 2 fields (104) had lower crop health in 2018 relative to 2017; this is shown by the lower peak in EVI2 at July-August 2018 compared to July-August 2017 in FIG. 15. However, while Non-Regenerative Profile 2 field (104) showed a marked decrease in health in August of 2018, Regenerative Profile 1 fields (103) stayed healthy longer (star shape in FIG. 15), suggesting that these fields were less impacted by water stress.

Figure 16:
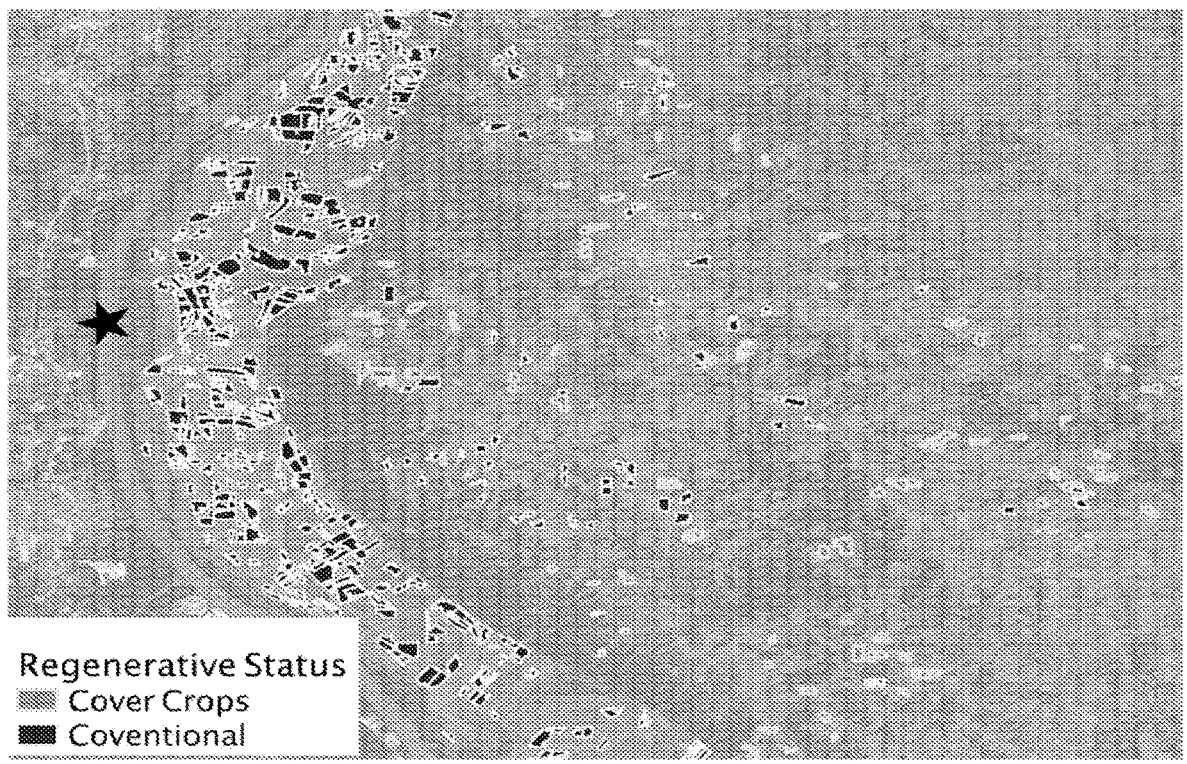
FIG. 16 is a map showing cover crops and conventional farming in an exemplary region according to embodiments of the present disclosure.
Figure 17:
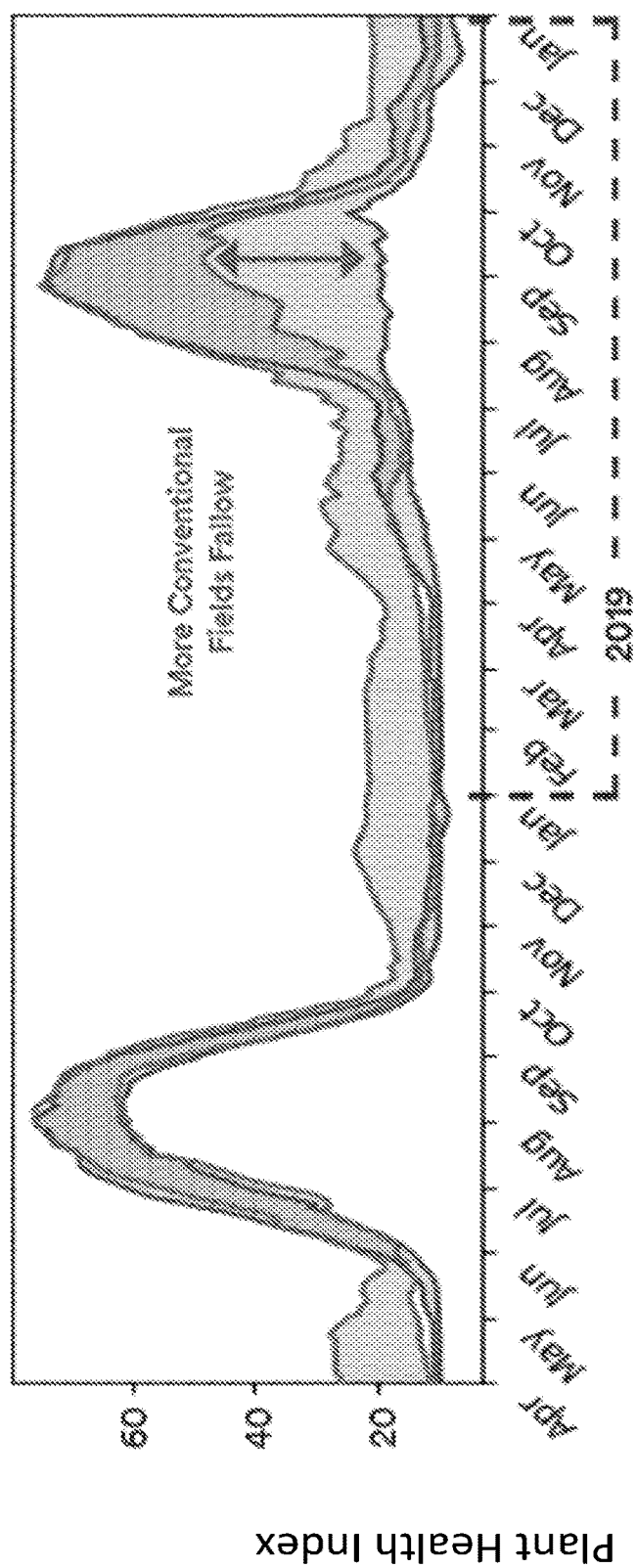
FIG. 17 shows the relative crop health index of regenerative and non-regenerative fields in Hancock county OH in 2018 and 2019 according to embodiments of the present disclosure.

In some embodiments, methods of the present disclosure are used to predict effects of environmental disturbances (for example, flooding) on crop production (for example, risk of crop loss), crop health, and crop management practices (for example, planting and replanting). For example, methods of the present disclosure were used to identify fields employing regenerative practices and conventional practices and their proximity to the Mississippi river (indicated by star shape in FIG. 16). Use of no-tillage practices can reduce soil erosion and increase water infiltration into soils, increasing resilience to some environmental disturbances such as flooding and enabling farming operations to recommence more quickly after a disturbance. For example, FIG. 17 shows the relative crop health index of regenerative and non-regenerative fields in Hancock county OH in 2018 and 2019. Hancock county was hard hit by flooding in 2019, meaning many fields were unable to be planted as indicated by the arrow in FIG. 17. Regenerative fields with a history of cover cropping were more likely to be able to plant compared to conventional fields.

In some embodiments, a map displaying a representation of regenerative practice utilization is displayed within a user interface of a client device such as a cell phone or personal computer. In some embodiments, a map representation of predicted regenerative practices is displayed within a user interface based on the user's proximity to a location displayed on the map, for example as identified by a GPS on the user's mobile device. In some embodiments, application of a regenerative practice prediction module to one or more fields is triggered by receiving a notification from a user's mobile device that the user is within a specified distance of the one or more fields. A user interface may also comprise a prompt requesting user input to confirm presence or absence of one or more regenerative practices at a map location. In some embodiments, the user interface displays directions to one or more map locations. In other embodiments, application of a regenerative practice prediction module to a geographic region, triggers a request for user confirmation of presence or absence of one or more regenerative practices to be automatically sent to one or more user's mobile devices. In some instances, the one or more users are selected based on their proximity to a field within the geographic region.

As set forth above, various embodiments employ certain classifiers. It will be appreciated that while the above examples describe certain classifiers, additional classifiers are suitable for use according to the present disclosure. Suitable alternative classifiers include random decision forests, linear classifiers, support vector machines (SVM), or neural networks such as recurrent neural networks (RNN). In some embodiments, the classifier is pre-trained using training data. In some embodiments training data is retrospective data. In some embodiments, the retrospective data is stored in a data store. In some embodiments, the learning system may be additionally trained through manual curation of previously generated outputs.

Figure 27:
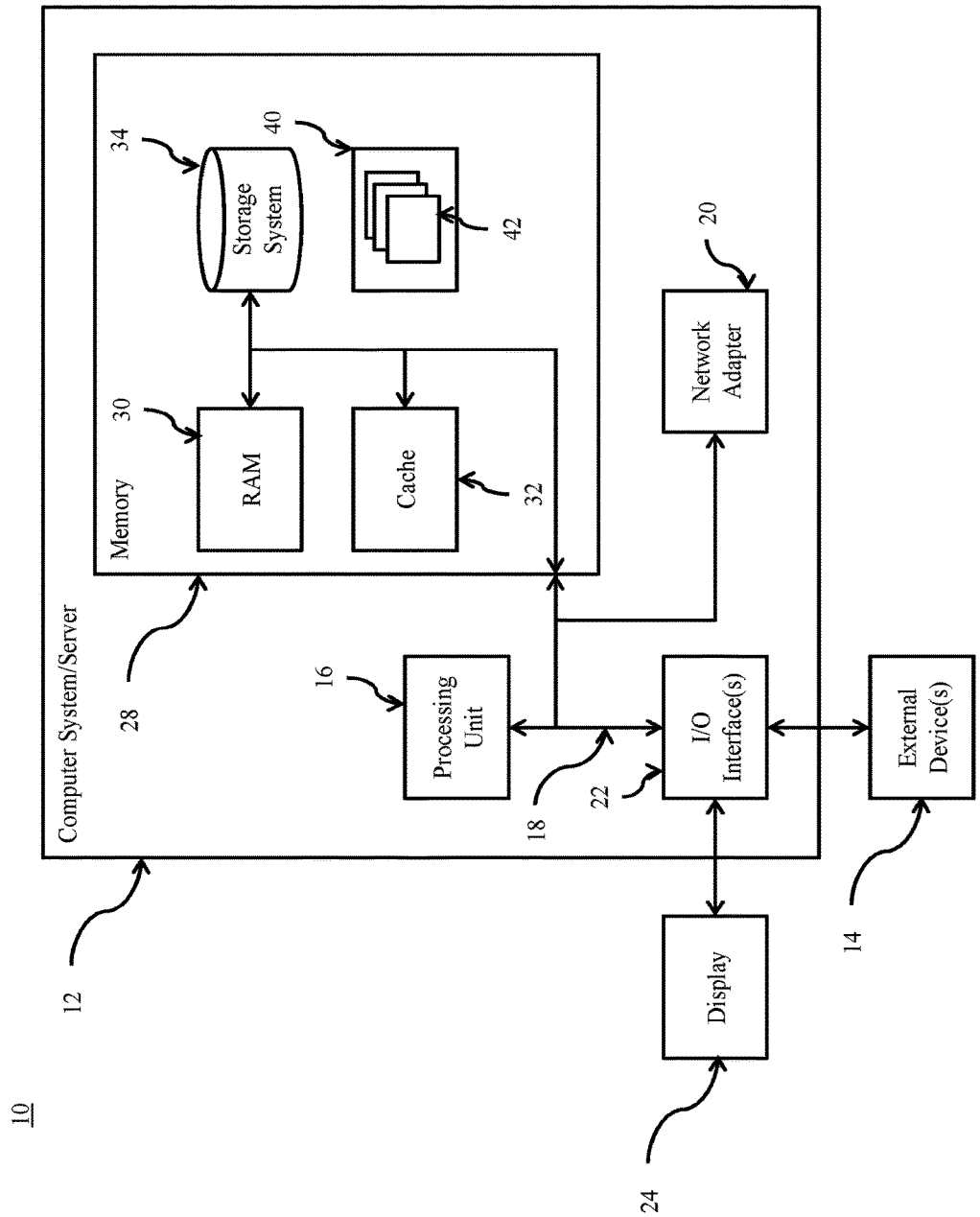
FIG. 27 depicts a computing node according to embodiments of the present disclosure.

Referring now to FIG. 27, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 27, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The figures depict various embodiments for purposes of illustration only. One skilled in the art will readily recognize from the following discussion that alternative embodiments of the structures and methods illustrated herein may be employed without departing from the principles described herein. Persons skilled in the relevant art can appreciate that many modifications and variations are possible in light of the above disclosure. For example, while reference is made to the transportation of crop products, in practice the methods of interaction described herein can apply equally to objects, goods, commodities, or products other than crop products (e.g., non-agricultural goods or products). Likewise, the methods of transportation of goods described here can apply equally to transportation by means of truck, rail, ships, etc.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus or system for performing the operations herein. Such an apparatus or system may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may include information resulting from a computing process, where the information is stored on a non-transitory, computer readable storage medium and may include any embodiment of a computer program product or other data described herein.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method of detecting a cover crop, the method comprising:
   based on a time-series of satellite imagery, determining a plurality of peaks in a vegetation index;
   for a candidate peak, determining a first inflection point between the candidate peak and a preceding peak and a second inflection point between the candidate peak and a subsequent peak;
   determining a plurality of time segments between the first inflection point and the candidate peak, each of the plurality of time segments preceding the candidate peak, wherein:
      a first time segment of the plurality of time segments is determined to extend from the first inflection point to a first interim point that precedes the candidate peak, the first interim point being at a first predefined percentage of a normalized amplitude of the candidate peak in the vegetation index;
      a second time segment of the plurality of time segments is determined to extend from the first interim point to a second interim point that precedes the candidate peak, the second interim point being at a second predefined percentage of the normalized amplitude of the candidate peak in the vegetation index, the second predefined percentage exceeding the first predefined percentage, the second predefined percentage being less than the normalized amplitude of the candidate peak;
      a third time segment of the plurality of time segments is determined to extend from the second interim point to a third interim point that precedes the candidate peak, the third interim point being at a third predefined percentage of the normalized amplitude of the candidate peak in the vegetation index, the third predefined percentage exceeding the second predefined percentage, the second predefined percentage being less than the normalized amplitude of the candidate peak; and
      the first time segment, the second time segment, and the third time segment are not of predefined lengths;
   determining one or more summary statistics for each of the plurality of time segments between the first inflection point and the candidate peak and for one or more summary statistics between the second inflection point and the candidate peak, wherein each of the one or more summary statistics is calculated across an entirety of its respective time segment; and
   providing the one or more summary statistics to a trained classifier, and receiving therefrom an indication of a presence or absence of a cover crop at the candidate peak.

2. The method of claim 1, wherein the vegetation index is Normalized Difference Vegetation Index (NDVI).

3. The method of claim 1, wherein the first predefined percentage is 15% of the normalized amplitude of the candidate peak.

4. The method of claim 3, wherein the second predefined percentage is 50% of the normalized amplitude of the candidate peak.

5. The method of claim 4, wherein the third time segment is determined to extend from 50% of the normalized amplitude of the candidate peak to 85% of the normalized amplitude of the candidate peak.

6. The method of claim 1, wherein the one or more summary statistics comprise one or more of:
   a rate of change in the vegetation index,
   a duration,
   a maximum value of the vegetation index,
   an average value of the vegetation index,
   a median value of the vegetation index, and
   a 90% percentile value of the vegetation index.

7. The method of claim 1, wherein the trained classifier is a random forest, k-nearest neighbor, or XGBoost classifier.

8. A non-transitory computer-readable medium comprising memory with instructions encoded thereon for detecting a cover crop, the instructions, when executed by one or more processors, causing the one or more processors to perform operations comprising:
   based on a time-series of satellite imagery, determining a plurality of peaks in a vegetation index;
   for a candidate peak, determining a first inflection point between the candidate peak and a preceding peak and a second inflection point between the candidate peak and a subsequent peak;
   determining a plurality of time segments between the first inflection point and the candidate peak, each of the plurality of time segments preceding the candidate peak, wherein:
      a first time segment of the plurality of time segments is determined to extend from the first inflection point to a first interim point that precedes the candidate peak, the first interim point being at a first predefined percentage of a normalized amplitude of the candidate peak in the vegetation index;
      a second time segment of the plurality of time segments is determined to extend from the first interim point to a second interim point that precedes the candidate peak, the second interim point being at a second predefined percentage of the normalized amplitude of the candidate peak in the vegetation index, the second predefined percentage exceeding the first predefined percentage, the second predefined percentage being less than the normalized amplitude of the candidate peak;
      a third time segment of the plurality of time segments is determined to extend from the second interim point to a third interim point that precedes the candidate peak, the third interim point being at a third predefined percentage of the normalized amplitude of the candidate peak in the vegetation index, the third predefined percentage exceeding the second predefined percentage, the second predefined percentage being less than the normalized amplitude of the candidate peak; and
      the first time segment, the second time segment, and the third time segment are not of predefined lengths;
   determining one or more summary statistics for each of the plurality of time segments between the first inflection point and the candidate peak and for one or more summary statistics between the second inflection point and the candidate peak, wherein each of the one or more summary statistics is calculated across an entirety of its respective time segment; and
   providing the one or more summary statistics to a trained classifier, and receiving therefrom an indication of a presence or absence of a cover crop at the candidate peak.

9. The non-transitory computer-readable medium of claim 8, wherein the vegetation index is Normalized Difference Vegetation Index (NDVI).

10. The non-transitory computer-readable medium of claim 8, wherein the first predefined percentage is 15% of the normalized amplitude of the candidate peak.

11. The non-transitory computer-readable medium of claim 10, wherein the second predefined percentage is 50% of the normalized amplitude of the candidate peak.

12. The non-transitory computer-readable medium of claim 11, wherein the third time segment is determined to extend from 50% of the normalized amplitude of the candidate peak to 85% of the normalized amplitude of the candidate peak.

13. The non-transitory computer-readable medium of claim 8, wherein the one or more summary statistics comprise one or more of:
   a rate of change in the vegetation index,
   a duration,
   a maximum value of the vegetation index,
   an average value of the vegetation index,
   a median value of the vegetation index, and
   a 90% percentile value of the vegetation index.

14. The non-transitory computer-readable medium of claim 8, wherein the trained classifier is a random forest, k-nearest neighbor, or XGBoost classifier.

15. A system comprising:
   a non-transitory computer-readable medium with instructions encoded thereon for detecting a cover crop; and
   one or more processors that, when executing the instructions, are caused to perform operations comprising:
      based on a time-series of satellite imagery, determining a plurality of peaks in a vegetation index;
      for a candidate peak, determining a first inflection point between the candidate peak and a preceding peak and a second inflection point between the candidate peak and a subsequent peak;
      determining a plurality of time segments between the first inflection point and the candidate peak, each of the plurality of time segments preceding the candidate peak, wherein:
         a first time segment of the plurality of time segments is determined to extend from the first inflection point to a first interim point that precedes the candidate peak, the first interim point being at a first predefined percentage of a normalized amplitude of the candidate peak in the vegetation index;
         a second time segment of the plurality of time segments is determined to extend from the first interim point to a second interim point that precedes the candidate peak, the second interim point being at a second predefined percentage of the normalized amplitude of the candidate peak in the vegetation index, the second predefined percentage exceeding the first predefined percentage, the second predefined percentage being less than the normalized amplitude of the candidate peak;
         a third time segment of the plurality of time segments is determined to extend from the second interim point to a third interim point that precedes the candidate peak, the third interim point being at a third predefined percentage of the normalized amplitude of the candidate peak in the vegetation index, the third predefined percentage exceeding the second predefined percentage, the second predefined percentage being less than the normalized amplitude of the candidate peak; and
         the first time segment, the second time segment, and the third time segment are not of predefined lengths;
      determining one or more summary statistics for each of the plurality of time segments between the first inflection point and the candidate peak and for one or more summary statistics between the second inflection point and the candidate peak, wherein each of the one or more summary statistics is calculated across an entirety of its respective time segment; and
      providing the one or more summary statistics to a trained classifier, and receiving therefrom an indication of a presence or absence of a cover crop at the candidate peak.

16. The system of claim 15, wherein the vegetation index is Normalized Difference Vegetation Index (NDVI).

17. The system of claim 15, wherein the first predefined percentage is 15% of the normalized amplitude of the candidate peak.

18. The system of claim 17, wherein the second predefined percentage is 50% of the normalized amplitude of the candidate peak.

19. The system of claim 18, wherein the third time segment is determined to extend from 50% of the normalized amplitude of the candidate peak to 85% of the normalized amplitude of the candidate peak.

20. The system of claim 15, wherein the one or more summary statistics comprise one or more of:
   a rate of change in the vegetation index,
   a duration,
   a maximum value of the vegetation index,
   an average value of the vegetation index,
   a median value of the vegetation index, and
   a 90% percentile value of the vegetation index.

* * * * *